(12) United States Patent
Feng et al.

(10) Patent No.: US 12,348,654 B2
(45) Date of Patent: Jul. 1, 2025

(54) BLOCKCHAIN-BASED METHODS AND APPARATUSES FOR PROCESSING DATA, DEVICES AND READABLE STORAGE MEDIUMS

(71) Applicant: TENCENT TECHNOLOGY (SHENZHEN) COMPANY LIMITED, Shenzhen (CN)

(72) Inventors: Haoming Feng, Shenzhen (CN); Zheming Yan, Shenzhen (CN); Haitao Tu, Shenzhen (CN); Libao He, Shenzhen (CN); Jiabao Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 18/218,841

(22) Filed: Jul. 6, 2023

(65) Prior Publication Data

US 2023/0353393 A1 Nov. 2, 2023

Related U.S. Application Data

(63) Continuation of application No. PCT/CN2022/132559, filed on Nov. 17, 2022.

(30) Foreign Application Priority Data

Feb. 24, 2022 (CN) .......................... 202210174690.7

(51) Int. Cl.
 *H04L 9/00* (2022.01)
(52) U.S. Cl.
 CPC .......... *H04L 9/50* (2022.05); *H04L 2209/463* (2013.01)

(58) Field of Classification Search
 None
 See application file for complete search history.

(56) References Cited

U.S. PATENT DOCUMENTS 10,691,676 B1* 6/2020 Zhang ................. G06F 16/2379
11,055,712 B2* 7/2021 Zhuo ..................... G06F 21/602
(Continued)

FOREIGN PATENT DOCUMENTS

AU 2019204722 B2 6/2019
CN 110800008 A 2/2020
(Continued)

OTHER PUBLICATIONS

International Search Report with English Translation and Written Opinion, Feb. 7, 2023, pp. 1-9, issued in International (PCT) Application No. PCT/CN2022/132559, China National Intellectual Property Administration, Beijing, China.

(Continued)

*Primary Examiner* — Joshua Joo
(74) *Attorney, Agent, or Firm* — Crowell & Moring LLP

(57) ABSTRACT

The present disclosure discloses methods, apparatus, and storage medium for processing blockchain-based data. The method includes: creating a first world state corresponding to an initial block; updating the first world state according to transactions in the initial block to obtain an initial update state, and performing processing of constructing a clean state tree on the initial update state based on a world state chain to obtain an updated first world state including a clean present world state tree; writing a first world state root corresponding to the clean present world state tree into the initial block to obtain a to-be-on-chained block, writing the to-be-on-chained block into a blockchain when the to-be-on-chained block is approved by consensus, committing the updated first world state to a latest on-chain world state step (Continued)

by step via the world state chain, and determining the updated first world state as a new consensus root world state.

20 Claims, 13 Drawing Sheets

(56) References Cited

U.S. PATENT DOCUMENTS

| | | | |
|---|---|---|---|
| 2019/0287099 A1* | 9/2019 | Tan | G06Q 20/3827 |
| 2020/0026712 A1* | 1/2020 | Madisetti | H04L 9/12 |
| 2020/0195441 A1* | 6/2020 | Suen | G06F 16/1805 |
| 2020/0364205 A1 | 11/2020 | Novotny et al. | |
| 2021/0149775 A1* | 5/2021 | Novotny | H04L 9/3239 |
| 2021/0258152 A1* | 8/2021 | Sung | H04L 9/0825 |
| 2021/0314162 A1* | 10/2021 | Li | H04L 9/3239 |
| 2023/0096457 A1* | 3/2023 | Wang | G06F 16/2365 707/610 |
| 2025/0053435 A1* | 2/2025 | Khan | G06F 9/45558 |

FOREIGN PATENT DOCUMENTS

| | | | | |
|---|---|---|---|---|
| CN | 112988469 A | * | 6/2021 | G06F 11/1438 |
| CN | 113994324 A | | 1/2022 | |
| CN | 114064984 A | | 2/2022 | |
| WO | WO 2020/098818 A3 | | 5/2020 | |

OTHER PUBLICATIONS

Extended European Search Report dated Feb. 5, 2025 in European Patent Application No. 229283007, 6 pages.

* cited by examiner

BLOCKCHAIN-BASED METHODS AND APPARATUSES FOR PROCESSING DATA, DEVICES AND READABLE STORAGE MEDIUMS

RELATED APPLICATION

This application is a continuation application of PCT Patent Application No. PCT/CN2022/132559, filed on Nov. 17, 2022, which claims priority to Chinese Patent Application No. 202210174690.7, filed with the Patent Office of China on Feb. 24, 2022, both of which are incorporated herein by reference in their entireties.

FIELD OF THE TECHNOLOGY

The present disclosure relates to the technical field of computers, in particular to a blockchain-based method and apparatus for processing data, a device and a readable storage medium.

BACKGROUND OF THE DISCLOSURE

A blockchain system is a blockchain network composed of multiple blockchain nodes. Each blockchain node stores the latest on-chain world state corresponding to the blockchain network, i.e., the world state composed of the state data owned by each account in the blockchain network after the block of the largest block height in the blockchain is on-chain.

In the current blockchain network, the execution of transactions within the block will modify some of the state data owned by several accounts, so that every time a block is on-chain, there is a corresponding new latest on-chain world state. During consensus, the new block will need to rely on the corresponding latest on-chain world state after its parent block is on-chain to determine its corresponding latest on-chain world state after being on-chain, so current consensus mechanisms tend to allow only one block to perform a consensus. If a consensus mechanism that allows multiple blocks to perform a consensus at the same time is used, it is often impossible to guarantee the consistency of state data of a blockchain system.

The present disclosure describes embodiments for processing blockchain-based data, addressing at least one of the problems/issues discussed above, maintaining world states of a plurality of blocks and/or ensuring the consistency of state data, and thus improving blockchain technology and broadening its application.

SUMMARY

Embodiments of the present disclosure provide a method and apparatus for processing data, a device and a readable storage medium, where the world state of multiple blocks to be on-chained can be maintained to ensure the consistency of state data of a blockchain system.

The present disclosure describes a method for processing blockchain-based data, and the method is executed by a computer device. The method includes generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block; updating the first world state according to transactions in the initial block to obtain an initial updated state, and performing processing of constructing a clean state tree on the initial updated state based on the world state chain to obtain an updated first world state, the updated first world state comprising a clean present world state tree; adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

The present disclosure describes an apparatus for processing blockchain-based data. The apparatus includes a memory storing instructions; and a processor in communication with the memory. When the processor executes the instructions, the processor is configured to cause the apparatus to perform: generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block; updating the first world state according to transactions in the initial block to obtain an initial updated state, and performing processing of constructing a clean state tree on the initial updated state based on the world state chain to obtain an updated first world state, the updated first world state comprising a clean present world state tree; adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

The present disclosure describes a non-transitory computer-readable storage medium, storing computer-readable instructions. The computer-readable instructions, when executed by a processor, are configured to cause the processor to perform: generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block; updating the first world state according to transactions in the initial block to obtain an initial updated state, and performing processing of constructing a clean state tree on the initial updated state based on the world state chain to obtain an updated first world state, the updated first world state comprising a clean present world state tree; adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

In another aspect, an embodiment of the present disclosure provides a blockchain-based method for processing data, the method being executed by a computer device, and including:

generating an initial block, and creating a first world state corresponding to the initial block; the first world state having a chained relationship pointing to a second world state, the second world state being a world state corresponding to a parent block of the initial block; the first world state and the second world state existing in a world state chain; the second world state being a consensus root world state in a case that the parent block is a block with the largest block height in on-chained blocks; the first world state in the world state chain being a latest on-chain world state; the consensus root world state having a chained relationship pointing to the latest on-chain world state; the latest on-chain world state being used for recording a latest world state corresponding to the on-chained block;

updating the first world state according to transactions in the initial block to obtain an initial update state, and performing processing of constructing a clean state tree on the initial update state based on the world state chain to obtain an updated first world state, the updated first world state including a clean present world state tree;

writing a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and writing the to-be-on-chained block into a blockchain in a case that the consensus result is a consensus pass result, committing the updated first world state to the latest on-chain world state step by step via the world state chain, and determining the updated first world state as a new consensus root world state, the new consensus root world state having a chained relationship pointing to the committed latest on-chain world state.

In one aspect, an embodiment of the present disclosure provides a blockchain-based apparatus for processing data, the apparatus being deployed on a computer device, and including:

an initialization module, configured to generate an initial block;

a state creating module, configured to create a first world state corresponding to the initial block; the first world state having a chained relationship pointing to a second world state, the second world state being a world state corresponding to a parent block of the initial block; the first world state and the second world state existing in a world state chain; the second world state being a consensus root world state in a case that the parent block is a block with the largest block height in on-chained blocks; the first world state in the world state chain being a latest on-chain world state; the consensus root world state having a chained relationship pointing to the latest on-chain world state; the latest on-chain world state being used for recording a latest world state corresponding to the on-chained block;

a first state updating module, configured to update the first world state according to transactions in the initial block to obtain an initial update state;

a second state updating module, configured to perform processing of constructing a clean state tree on the initial update state according to the world state chain to obtain an updated first world state, the updated first world state including a clean present world state tree;

a consensus module, configured to write a first world state root corresponding to the clean present world state tree into the initial block to obtain a to-be-on-chained block, and transmit a consensus block to consensus nodes to cause the consensus node to perform consensus processing on the to-be-on-chained block based on the first world state root to obtain a consensus result; and a state committing module, configured to write the to-be-on-chained block into a blockchain in a case that the consensus result is a consensus pass result, commit the updated first world state to the latest on-chain world state step by step via the world state chain, and determine the updated first world state as a new consensus root world state, the new consensus root world state having a chained relationship pointing to the committed latest on-chain world state.

In one aspect, an embodiment of the present disclosure provides a computer device, including: a processor, a memory and a network interface;

the processor being connected to the memory and the network interface, where the network interface is configured to provide data communication network elements, the memory is configured to store computer programs, and the processor is configured to call the computer program to execute the method in the embodiment of the present disclosure.

In one aspect, an embodiment of the present disclosure provides a computer-readable storage medium, computer programs being stored in the computer-readable storage medium, the computer program being applicable to be loaded by a processor and execute the method in the embodiment of the present disclosure.

In one aspect, an embodiment of the present disclosure provides a computer program product, the computer program product including computer programs/instructions, the computer program/instruction being stored in a computer-readable storage medium, a processor of a computer device reading the computer program/instruction from the computer-readable storage medium, the processor executing the computer program/instruction, so that the computer device executes the method in the embodiment of the present disclosure.

In the embodiment of the present disclosure, by constructing the world state chain, it is possible to simultaneously maintain world states of different branches of different block heights or the same block height, i.e., each time a new block is created, a world state is created for the new block, and the world state is added into the world state chain; the first world state in the world state chain is the latest on-chain world state after the transaction in the on-chained latest block has been executed; the second world state in the world state chain is the consensus root world state confirmed by consensus last time, and the world state after that is the world state corresponding to a block under consensus. The consensus root world state has a chained relationship pointing to the latest on-chain world state, and the world state corresponding to the block under consensus has a chained relationship pointing to the world state corresponding to the parent block thereof. If the parent block thereof is the on-chained block, it has a chained relationship pointing to the consensus root world state, and due to the chained relationship of each world state, the chained structure of the world state chain is formed. Therefore, it can be guaranteed that no matter how many blocks are under consensus at the same time, after the block consensus passes, the corresponding world state thereof will be committed to the latest on-chain world state step by step in accordance with the chained structure of the world state chain, which ensures the consistency of the state data of the blockchain system.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

DESCRIPTION OF EMBODIMENTS

Figure 1:
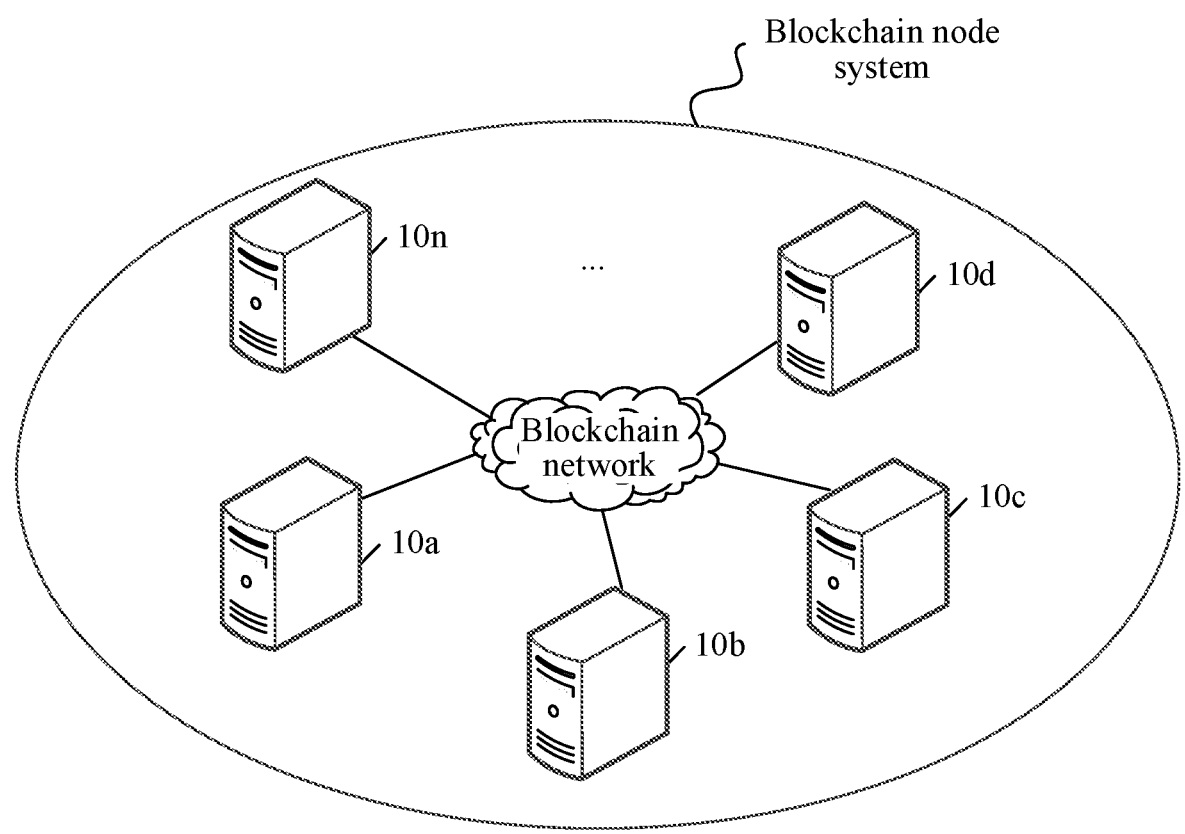
FIG. 1 is a schematic structural diagram of a blockchain node system according to an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

For ease of understanding, a blockchain and related concepts thereof are described below:

Blockchain: the blockchain is a new application mode of distributed data storage, peer-to-peer transmission, consensus mechanisms and other computer technologies such as encryption algorithms. The blockchain is mainly used for organizing data in chronological order and encrypting the data into a ledger so that it cannot be tampered or falsified, while allowing data verification, storage and updating. The blockchain is essentially a decentralized database in which each node stores an identical blockchain. A blockchain network can distinguish nodes as consensus nodes and service nodes, where the consensus nodes are responsible for the consensus of the entire blockchain network. The process that transaction data in the blockchain network are written into the ledger can be as follows: a client sends transaction data to the service node, the transaction data is then passed between the service nodes in the blockchain network in the form of a baton until the consensus node receives the transaction data, the transaction data is then packaged into a block by the consensus node to reach a consensus with other consensus nodes, and after the consensus is passed, the block carrying the transaction data is written into the ledger.

Block: a data packet that carries the transaction data (i.e. transaction service) on the blockchain network, and a data structure that is tagged with a timestamp and the hash value of a previous block. The block is verified by the consensus mechanism of the network and the transaction in the block is determined.

Hash value: also known as a message feature value or feature value. The hash value is generated by a hashing algorithm that converts input data of arbitrary length into a cipher and performs fixed output. Original input data cannot be retrieved by decrypting the hash value, which is a one-way cryptographic function. In the blockchain, each block (except the initial block) contains the hash value of a predecessor block, and the predecessor block is known as the parent block of the current block. The hash value is the potential core foundation and most important aspect in the blockchain technology, preserving the authenticity of recorded and viewed data, and the integrity of the blockchain as a whole.

Transaction: transaction sent by a blockchain account with a transaction hash inside as a unique identifier, containing an account address identifying the blockchain account sending the transaction.

State snapshot: representing a snapshot of all state data within a certain range, with a hash value of a fixed length. When any state data changes in any way, the state snapshot will change, thus allowing the integrity of all the state data to be determined.

Account: a blockchain account containing an account address inside as a unique identifier and containing a balance as the digital asset of the account in the present world state. Each account has a plurality of state data, and the account contains an account state root as a state snapshot of all the state data thereof.

State data: data of an account stored in the blockchain, such as how many assets which a certain account has, or other data that needs to be read or updated by a smart contract, with each state data represented as a key value pair.

On-chain: each block contains a number of transactions and when a block is inserted by consensus into the blockchain data structure within each blockchain node, the process is called on-chain.

World state: a view of the persistent data owned by each account within the blockchain. Since the execution of the transaction itself will modify some of the persistent data of several accounts, a new world state is generated after each transaction within each block is executed, and the world state of each blockchain node is updated after each block is on-chained. The world state is necessarily the same for each blockchain node after the same block is on-chained.

MPT: Merkle Patricia Trie, a tree structure for organizing state data, containing three types of nodes: data nodes, expansion nodes, and branch nodes. The state data contains state data keys and state data values. The data nodes are leaf nodes of the tree structure that will only appear at the bottom of the MPT and store the actual state data values; The expansion nodes are parent nodes with only one child node, containing a character string of an arbitrary length, representing a part of the state data key, and another tree node hash pointing to the child node. The branch nodes can have parent nodes of 1-16 child nodes, with an array of hash values of capacity 16, and the 16 positions in the array correspond to 0-9-a-f in the hexadecimal respectively, each having the potential to point to one child node as a tree node hash. The tree node hash is the hash value of the child node in MPT and is stored in the parent node.

State tree: the embodiment in the present disclosure contains an account state tree and a world state tree, both of which use the MPT as a data structure for organizing the state data of the blockchain and may provide the following operations.

(1) Query: a state data value can be queried from the state tree based on the state data key, and at this moment, a tree node query source needs to be provided to the state tree. The tree node query source is a data structure that helps the state tree to quickly find tree nodes therefrom with the tree node hash as a condition. Each tree node in the state tree is stored as a key value pair in the database, with a storage key being the hash value of the tree node and a storage value being the tree node, so the tree node can be found quickly from the database based on the tree node hash. And because each parent node in the state tree contains the tree node hash of all the child nodes thereof, all the child nodes thereof can be expanded by the parent node from the database.

(2) Update: the state data value can be updated into the state tree based on the state data key.

(3) Obtaining a state tree root: calculating and acquiring the hash value of the root of the state tree.

(4) Commit: each tree node of the state tree is committed into a tree node update cache. Because each tree node in the state tree is stored in the database as a key value pair, the storage key is the hash value of the tree node and the storage value is the tree node. Therefore, when a commit operation is performed by the state tree, a data structure that receives and stores the key value pair with the tree node hash as the key and the tree node as the value is required, and the data structure is called the tree node update cache.

Referring to FIG. 1, FIG. 1 is a schematic structural diagram of a blockchain node system according to an embodiment of the present disclosure. The blockchain node system as shown in FIG. 1 may correspond to a blockchain network, and the blockchain network may include, but is not limited to, a blockchain network corresponding to a consortium blockchain. The blockchain node system refers to a system for carrying out data sharing between blockchain nodes and blockchain nodes, and the blockchain node system may include a plurality of blockchain nodes, and the plurality of blockchain nodes may specifically include blockchain nodes 10a, blockchain nodes 10b, blockchain nodes 10c, blockchain nodes 10d, . . . , blockchain nodes 10n. Each blockchain node can receive data sent from the outside world while carrying out normal work and perform block on-chain processing based on the received data, and can also send data to the outside world. In order to ensure data interoperability between the various blockchain nodes, a data connection may exist between all the blockchain nodes, for example, a data connection exists between the blockchain node 10a and the blockchain node 10b, a data connection exists between the blockchain node 10a and the blockchain node 10c, and a data connection exists between the blockchain node 10b and the blockchain node 10c.

It will be appreciated that data or block transmission between the blockchain nodes may be performed via the above data connections. The blockchain network can achieve the data connections between the blockchain nodes based on node identifiers. Each blockchain node in the blockchain network has a node identifier corresponding thereto, and each of the above blockchain nodes can store the node identifier of other blockchain nodes having a connection relationship with the blockchain node itself, so that data acquired or blocks generated can be subsequently broadcast to other blockchain nodes based on the node identifier of the other blockchain nodes. For example, the blockchain node 10a may maintain a list of node identifiers as shown in Table 1, and node names and node identifiers of other nodes are saved in the list of node identifiers.

TABLE 1

| Node name | Node identifier |
|---|---|
| Node 10a | 117.114.151.174 |
| Node 10b | 117.116.189.145 |
| Node 10c | 117.114.151.183 |
| Node 10d | 117.117.125.169 |
| . . . | . . . |
| Node 10n | 117.116.189.125 |

The node identifier may be an Internet Protocol (IP) address between networks and any other kind of information that can be used for identifying the node in the blockchain network, as illustrated in Table 1 by IP address only. For example, the blockchain node 10a may send information (e.g., block) to the blockchain node 10b by the node identifier 117.116.189.145, and the blockchain node 10b may determine that the information was sent by the blockchain node 10a by the node identifier 117.114.151.174.

In a blockchain, before a block is on-chain, the block has to go through consensus nodes in the blockchain network to reach a consensus, and the block can be added to the blockchain only after the consensus has passed. It will be appreciated that when the blockchain is used in some scenarios in government or commercial organizations, not all participating nodes in the blockchain (i.e. blockchain nodes in the blockchain node system) have sufficient resources and necessity to become the consensus node in the blockchain. For example, in the blockchain node system shown in FIG. 1, the blockchain node 10a, the blockchain node 10b, the blockchain node 10c and the blockchain node 10d may be used as the consensus nodes in that blockchain node system. The consensus nodes in the blockchain node system participate in consensus, i.e., performing consensus on blocks (containing a batch of transactions), including generating blocks and voting on the blocks; Non-consensus nodes, on the other hand, do not participate in consensus, but help to propagate the blocks and information about voting, as well as the synchronization state with each other, etc.

The blockchain node may contain the following modules.

Transaction pool: each blockchain node receives transactions sent by users and caches same in the transaction pool. When a blockchain node is selected as a block coming node according to the consensus mechanism, the blockchain node will create a new block in an internal memory and pack the transactions in the transaction pool into the new block.

Consensus module: packing the transactions to generate candidate blocks and reaching a consensus among the various blockchain nodes to generate the new block based on the consensus mechanism.

Smart contract container: each transaction within the block needs to be executed during the execution of the consensus mechanism, which is essentially the process of executing a smart contract within the transaction, and state data may need to be read or updated during the execution of the smart contract, and the module provides an execution environment for the execution of the smart contract;

World state management; responsible for the maintenance and management of the world state of the block in each consensus.

Key value database: storing data in persistence in the form of key value pairs, where values can be quickly found based on keys, and in this application, it is responsible for persistent storage of data for each block and tree node storage, for the tree node storage, the hash value of each tree node of the state tree is used as a key and each tree node is used as a value, and thus the tree nodes can be quickly found based on tree node hashes.

It will be appreciated that the above data connection is not limited by a connection method, and may be a direct or indirect connection by means of wired communication, or a direct or indirect connection by means of wireless communication, or may be achieved by other connection methods, and this application is not limited herein.

It will be appreciated that the method for processing data according to the embodiment of the present disclosure may be executed by a computer device, the computer device including, but not limited to, the blockchain node (which may be a server or a terminal). The server may be a stand-alone physical server, or a cluster of servers or a distributed system composed of multiple physical servers, or a cloud server providing cloud services, cloud databases, cloud computing, cloud functions, cloud storage, network services, cloud communication, middleware services, domain name services, security services, CDN, and other basic cloud computing services such as big data and artificial intelligence platforms. The terminal may be a smartphone, a tablet computer, a notebook computer, a desktop computer, a smart speaker, a smartwatch, or the like, but is not limited thereto.

It will be appreciated that the embodiment of the present disclosure may be applied to various scenarios, including but not limited to the cloud technology, artificial intelligence, intelligent transportation, aided driving and the like.

It will be appreciated that in the detail description of the present disclosure, user permission or consent is required for involved relevant data such as the state data when the above embodiment of the present disclosure is applied to specific products or technologies, and the collection, use and processing of the relevant data need to comply with relevant laws, regulations and standards of relevant countries and regions.

As shown in FIG. 1, the block coming node in the blockchain network, for example, the blockchain node 10a in the blockchain node system described above, may, after generating an initial block, create a first world state corresponding to the initial block, the first world state having a chained relationship pointing to a second world state, the second world state being a world state corresponding to a parent block of the initial block. At this moment, the first world state and the second world state exist in a world state chain; the second world state is a consensus root world state when the parent block is a block with the largest block height in on-chained blocks; the consensus root world state has a chained relationship pointing to a latest on-chain world state, the latest on-chain world state is the first world state in the world state chain and the latest on-chain world state is used for recording a latest world state corresponding to the on-chained block. Then updating the first world state according to transactions in the initial block to obtain an initial update state, and performing processing of constructing a clean state tree on the initial update state based on the world state chain to obtain an updated first world state including a clean present world state tree; writing a first world state root corresponding to the clean present world state tree into the initial block to obtain a to-be-on-chained block, and transmitting a consensus block to consensus nodes to cause the consensus node to perform consensus processing on the to-be-on-chained block based on the first world state root to obtain a consensus result; and writing the to-be-on-chained block into a blockchain when the consensus result is a consensus pass result, committing the updated first world state to the latest on-chain world state step by step via the world state chain, and determining the updated first world state as a new consensus root world state, the new consensus root world state having a chained relationship pointing to the committed latest on-chain world state.

Figure 2A:
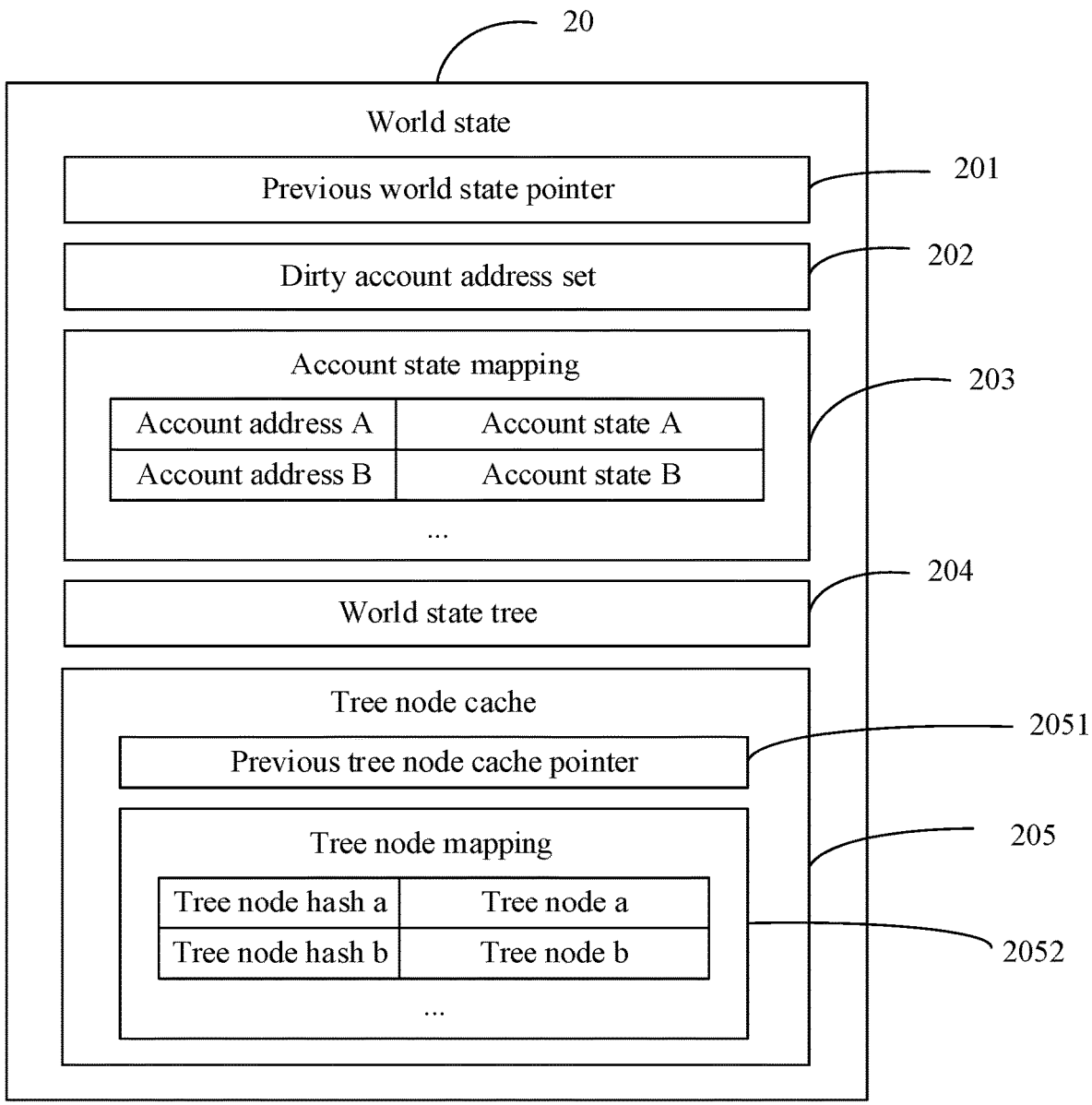
FIG. 2A is a schematic structural diagram of a world state according to an embodiment of the present disclosure.

To better understand the above process of world state management, please first refer to FIG. 2A, FIG. 2A is a schematic structural diagram of a world state according to an embodiment of the present disclosure; as shown in FIG. 2A, a world state 20 may contain a previous world state pointer 201, a dirty account address set 202, account state mapping 203, a world state tree 204, and a tree node cache 205. The previous world state pointer 201 points to the previous world state of the world state 20, and the previous world state of the world state 20 may be positioned in an internal memory by means of the previous world state pointer 201, and the previous world state pointer of the above latest on-chain world state is empty. The dirty account address set 202 is a set of account addresses of account states within the world state 20 that have been updated but have not yet been updated to the world state tree 204. The account state mapping 203 is a mapping structure mapped from the account address to the account state, and in the account state mapping 203, the account state can be quickly found based on the account address. The world state tree 204 refers to an MPT data structure organized with the account addresses as keys and account state roots as values. The account state root is a hash value of the root of an account state tree contained in the account state corresponding to the account address. The tree node cache 205 contains a previous tree node cache pointer 2051 and tree node mapping 2052, the previous tree node cache pointer 2051 pointing to the tree node cache of the previous world state of the world state 20, the previous tree node cache pointer of the tree node cache of the above latest on-chain world state pointing to tree node storage in a key value database. The tree node mapping 2052 is a mapping structure mapped from tree node hashes to tree nodes, and in the tree node mapping 2052, the tree nodes can be quickly found based on the tree node hashes. The tree node cache 205 will serve as a tree node query source for the world state tree 204 of the world state 20 and the account state tree of each account state in the account state mapping 203, and the world state tree 204 and the account state tree of each account state can search for the tree nodes from the tree node mapping of the tree node cache based on the tree node hashes; when a tree node is not found, a previous tree node cache will be positioned in the internal memory based on the previous tree node cache pointer, and operation continues to search for the tree node from the tree node mapping of the previous tree node cache based on the tree node hash; if the tree node is still not found, positioning to the previous one continues, and so on, until the previous tree node cache pointer of the foremost tree node cache serves as the tree node storage pointing to the key value database, and then operation continues to search for the tree node from the tree node storage based on the tree node hash. The tree node cache 205 will also act as a tree node update cache for the world state tree 204 and the account state tree of each account state in the account state mapping 203, and the world state tree 204 and the account state tree can be subject to commit operations, i.e., updated to the tree node mapping of the tree node cache with the tree node hash as the key and the tree node as the value.

Figure 2B:
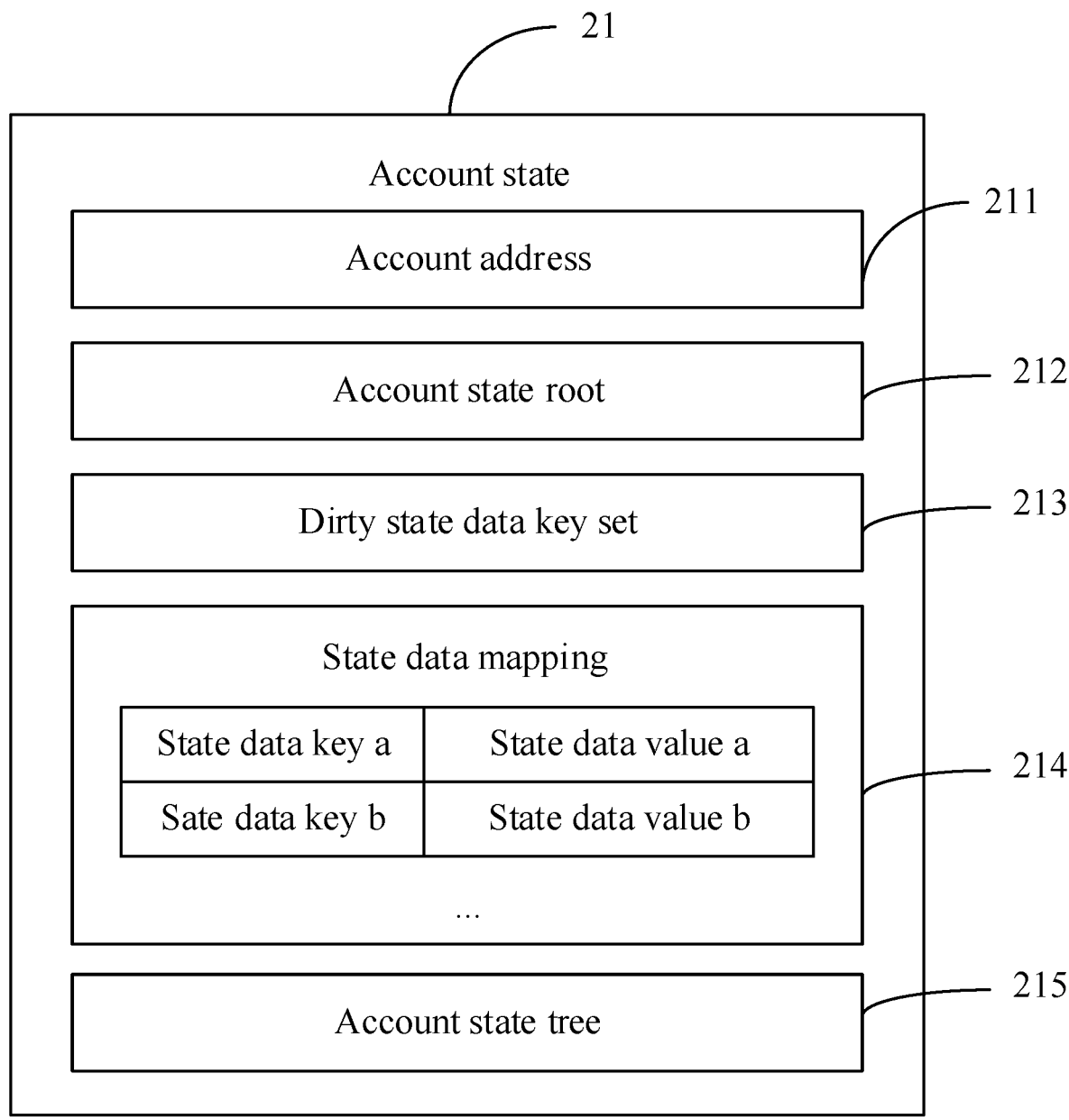
FIG. 2B is a schematic structural diagram of an account state according to an embodiment of the present disclosure.

Please refer to FIG. 2B together, and FIG. 2B is a schematic structural diagram of an account state according to an embodiment of the present disclosure. As shown in FIG. 2B, an account state 21 may contain an account address 211, an account state root 212, a dirty state data key set 213, state data mapping 214 and an account state tree 215. The account address 211 is a unique identifier for an account. The account state root 212 is the state tree root of the account state tree 215, that is, a hash value of the tree root thereof. The dirty state data key set 213 is the set of keys of state data in the account state 21 that have been updated but not updated to the account state tree 215. The state data mapping 214 is a mapping structure mapped from the state data keys to state data values, and in the state data mapping 214, the state data values can be quickly found based on the state data keys. The account state tree 214 is an MPT data structure organized with the state data keys as keys and the state data values as values.

Figure 2C:
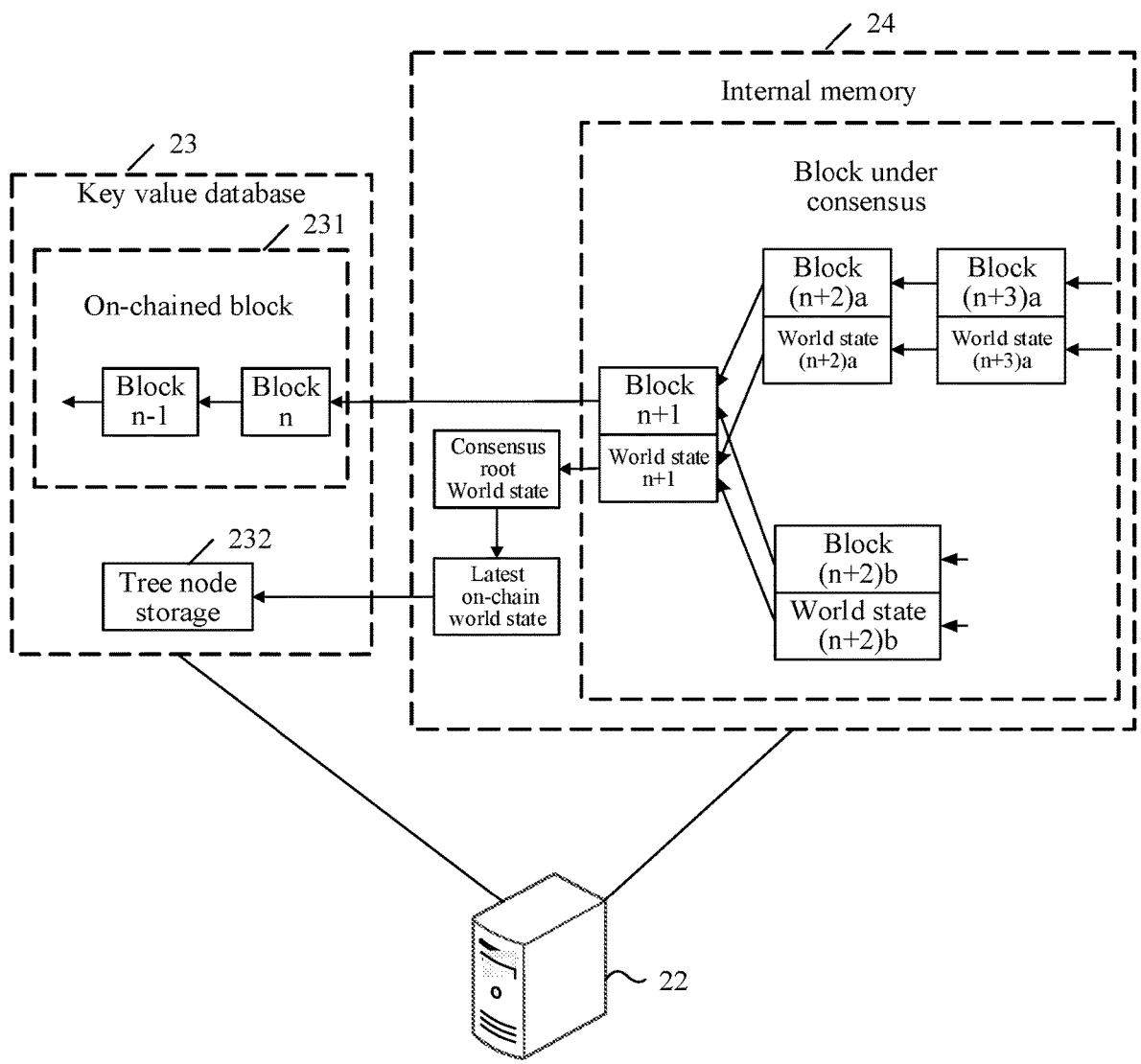
FIG. 2C is a schematic diagram of a scenario for managing the world state according to an embodiment of the present disclosure.

According to the method provided by the embodiment of the present disclosure, the world state can be constructed by the structure as shown in FIG. 2A above, the account state can be constructed by the structure as shown in FIG. 2B above, and then the constructed account state and world state are managed. For ease of understanding, please refer to FIG. 2C together, and FIG. 2C is a schematic diagram of a scenario for managing the world state according to an embodiment of the present disclosure. As shown in FIG. 2A, a key value database 23 of a block coming node 22 (which may be any of the blockchain nodes in the blockchain node system as shown in FIG. 1 above, e.g. the blockchain node 10b) stores an on-chained blockchain data structure 231, and the blockchain data structure 231 contains all the on-chained blocks. In addition, the key value database 23 contains a tree node storage 232, and in the tree node storage 232, each tree node and the hash value thereof in the account state tree corresponding to each account in the blockchain network and the world state tree corresponding to the latest on-chain world state are stored with the tree node hash value as the key and the tree node as the value. The latest on-chain world state is the world state after the transaction within the on-chained latest block has been executed.

As shown in FIG. 2C, the block coming node may maintain in an internal memory 24 a number of blocks of different heights that are under consensus, e.g. a block n+1 of the block height n+1, a block (n+2)a of the block height n+2, etc. Of course there may be different block branches at the same height according to the execution of the consensus mechanism, e.g. the block (n+2)a and a block (n+2)b of the block height n+2, but eventually only one branch will form consensus in the blockchain nodes of the blockchain network and complete the on-chain operation to enter the key value database 23. In addition, different world states are maintained in the internal memory 24, which contain not only the latest on-chain world state, but also the consensus root world state and the world state corresponding to the block under consensus. The consensus root world state is the world state corresponding to the block that was confirmed by consensus last time The world state corresponding to the block under consensus is, as the name implies, the corresponding world state being created for each block under consensus, representing the query source and update cache for the state data during and after the execution of transactions within the block. As can be seen from FIG. 2C, the world states corresponding to the blocks under consensus all have a chained relationship pointing to the world state corresponding to the parent blocks thereof, and the block coming node can acquire the world state corresponding to the parent block thereof through the chained relationship of the world state corresponding to a block under consensus, and then continue to acquire the world state corresponding to the parent block thereof according to the chain relationship of the world state corresponding to the parent block thereof. For example, a world state (n+2)a corresponding to the block (n+2)a has a chained relationship pointing to a world state n+1 corresponding to a parent block n+1 thereof. After a block coming node 20 acquires the world state (n+2)a corresponding to the block (n+2)a, the chained relationship which the world state (n+2)a has can be acquired, and then the world state n+1 is acquired according to the chained relationship. When the parent block of the block under consensus is the block passed by consensus in the previous round, the chained relationship of the world state of the block under consensus will point to the consensus root world state, so the world state of the block under consensus is inevitably created by the direct or indirect extension of the consensus root world state. In the consensus root world state, there is a chained relationship pointing to the latest on-chain world state. It will be appreciated that after the new block is in consensus, the world state corresponding to the new block will be determined as the consensus root world state, and the original consensus root world state can be emptied, after the new block is on-chain, it is only needed to update the latest on-chain world state to get the new latest on-chain world state, and the storage address thereof in the internal memory does not need to be changed.

Figure 2D:
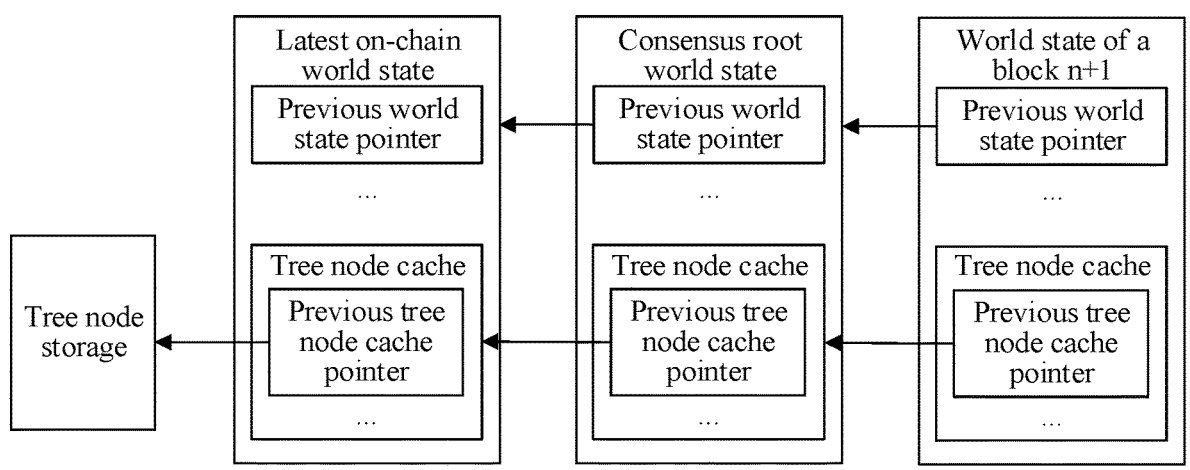
FIG. 2D is a schematic structural diagram of a world state chain according to an embodiment of the present disclosure.

It will be appreciated that the chained relationship of the world state can be reflected by the previous tree world state pointer and the previous tree node cache pointer thereof, and each world state points to the previous world state via the previous world state pointer, and the previous tree node cache pointer of the tree node cache points to the tree node cache of the previous world state, the previous world state pointer of the foremost world state is empty and the previous tree node cache pointer of the tree node cache points to the tree node storage of the key value database, thus forming the world state chain. For ease of understanding, please refer to FIG. 2D together, and FIG. 2D is a schematic structural diagram of a world state chain according to an embodiment of the present disclosure. As shown in FIG. 2D, in the world state chain, the first world state is the latest on-chain world state, and the latest on-chain world state has no previous world states, so the previous world state pointer of the latest on-chain world state is empty. In addition, the previous tree node cache pointer of the latest on-chain world state cannot point to the tree node cache of the previous world state, but the previous tree node cache pointer of the latest on-chain world state will point to the tree node storage (e.g., the tree node storage 232 as shown in FIG. 2C above). The second world state in the world state chain is the consensus root world state, and the previous world state of the consensus root world state is the latest on-chain world state, and the previous tree node cache pointer of the tree node cache thereof points to the tree node cache of the latest on-chain world state. The world state chain starts from the third world state which is the world state corresponding to the block under consensus, and the previous world state pointer and the previous tree node cache pointer of the tree node cache point to the world state of the parent block of the block and the tree node cache of the world state of the parent block, respectively. Of course, it is also permissible for the previous world state pointer of the world state of two different blocks under consensus and the previous tree node cache pointer of the tree node cache to point to the same previous world state and the tree node cache within it. In other words, the world state chain can branch after the consensus root world state.

Figure 3:
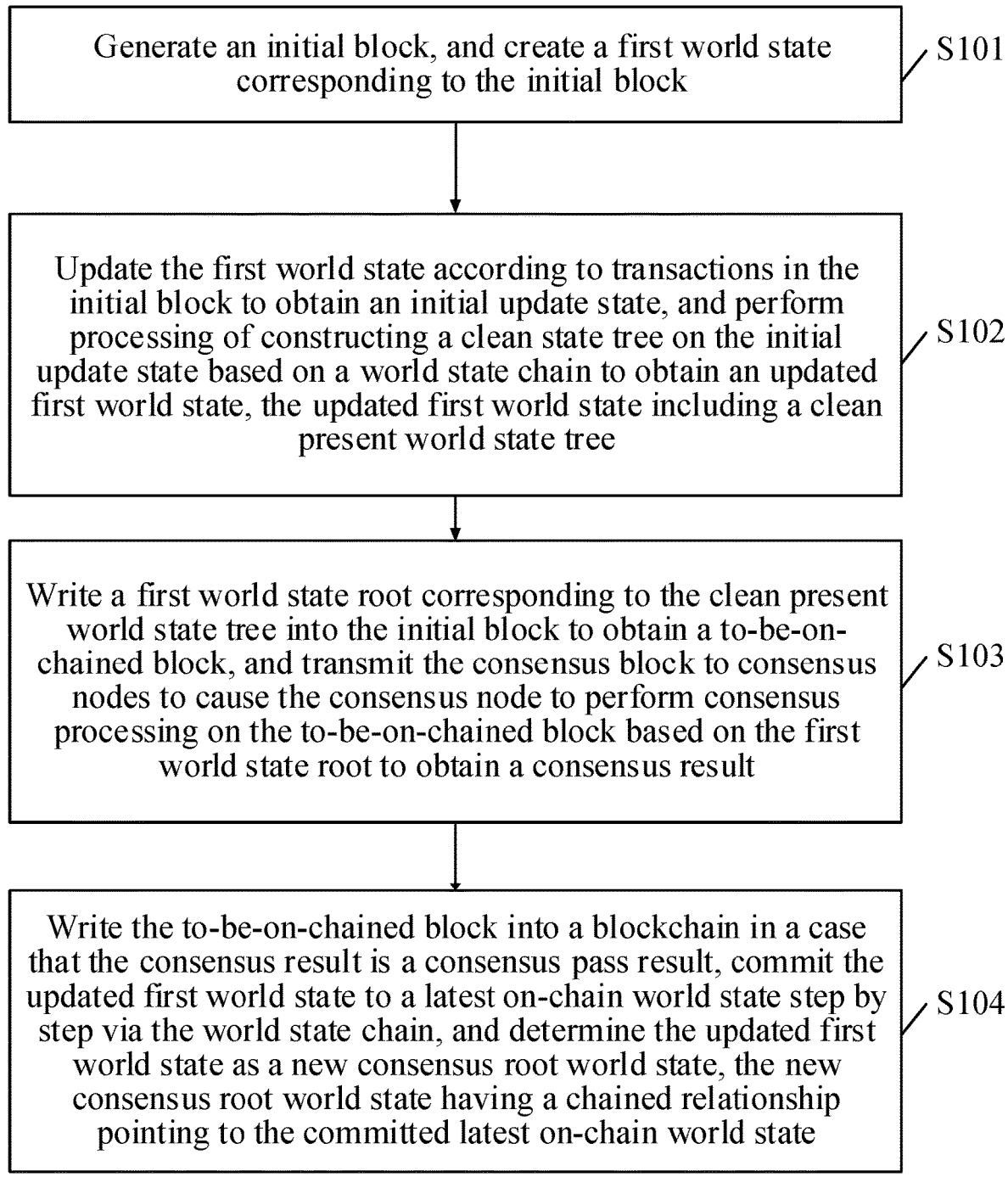
FIG. 3 is a schematic flowchart of a blockchain-based method for processing data according to an embodiment of the present disclosure.

For the world state corresponding to the block under consensus, it will eventually be committed to the latest on-chain world state, and when the block under consensus completes consensus, the corresponding world state thereof will become the new consensus root world state with a chained relationship pointing to the latest on-chain world state. To facilitate understanding of the specific process of world state management by the embodiment of the present disclosure, further, please refer to FIG. 3, and FIG. 3 is a schematic flowchart of a blockchain-based method for processing data according to an embodiment of the present disclosure. The method may be executed by a block coming node (e.g., any blockchain node in the blockchain node system 10 in the embodiment corresponding to FIG. 1 above). The method will be illustrated below as an example of the method being executed by the block coming node, where the blockchain-based method for processing may include S101-S104 as follows. The method may be preformed by a computer device, which includes a memory storing instructions and a processor in communication with the memory, wherein the processor is configured to execute the instructions to perform a portion or all of the steps in the method.

S101: Generate an initial block, and create a first world state corresponding to the initial block. In some implementations, S101 may include generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block.

Each blockchain node may receive transactions, and then the transaction is cached into a transaction pool. The block coming node can be selected in the blockchain network based on a consensus mechanism, and when a blockchain node is selected as the block coming node, a new block is created in an internal memory, the new block contains a hash value of a parent block thereof, and by the hash value of the parent block, the parent block thereof can be searched for, then the block coming node can pack the transactions in the transaction pool into the new block, and the initial block is obtained. At this moment, the block coming node can create the first world state corresponding to the initial block.

In one possible embodiment, the process of creating the first world state corresponding to the initial block could be that the block coming node first acquires a second world state corresponding to the parent block thereof, and then world state initialization is performed based on the second world state of the parent block thereof to obtain the first world state. If the parent block of the initial block has already been written into the blockchain data structure, the parent block of the initial block can only be a latest on-chained block in the blockchain, and the second world state corresponding to the parent block is the world state passed by consensus in the last round, i.e., the second world state corresponding to the parent block at this time is the consensus root world state as shown in FIG. 2C above. If the parent block of the initial block has not yet been written into the blockchain data structure, the parent block of the initial block is under consensus at this time, and the corresponding world state thereof is the world state corresponding to the block under consensus as shown in FIG. 2C above, for example, the world state n+1. It will be appreciated that both the first world state and the second world state are in the world state chain, and the first world state in the world state chain is the latest on-chain world state, and the latest on-chain world state is used for recording the latest world state corresponding to the on-chained block. A second consensus root world state is the consensus root world state, and the consensus root world state has a chained relationship pointing to the latest on-chain world state, in other words, the second world state may be the second world state in the world state chain, or may be a world state after the second world state, and the first world state is after the second world state in the world state chain.

In one possible embodiment, a possible implementation method for creating the first world state corresponding to the initial block is: creating an initial world state corresponding to the initial block, the initial world state containing a first previous world state pointer and a first tree node cache, the first tree node cache containing a first previous tree node cache pointer; then, the first previous world state pointer points to the second world state corresponding to the parent block of the initial block, and the first previous tree node cache pointer points to the second tree node cache contained in the second world state to obtain the first world state corresponding to the initial block. At this moment, the structural composition of the first world state can still refer to the world state 20 shown in FIG. 2A above, only the first previous world state pointer and the first previous tree node cache pointer of the first world state are initialized by the block coming node, and the structures of the dirty account address set, the account state mapping, the world state tree, the tree node mapping, etc. can be initialized as an empty set first, or can be added into the first world state during later use. The embodiment of the present disclosure is not limited here. However, illustration is performed with an example that the world state is generated at the time of creation according to the world state structure as shown in FIG. 2A, and an empty set is created by default if no corresponding data exists.

S102: Update the first world state according to the transactions in the initial block to obtain an initial update state, and perform processing of constructing a clean state tree on the initial update state according to the world state chain to obtain an updated first world state, the updated first world state including a clean present world state tree.

Some of the state data contained in a number of accounts in the blockchain will be modified during the execution of the transactions in the initial block, and the block coming node may gradually execute each transaction in the initial block, determine the state data needing to be modified after the execution of each transaction as to-be-updated data, and then update the first world state according to the to-be-updated data to finally obtain the initial update state. At this moment, the account state mapping of the initial update state will contain the account address of the account needing to be updated and the updated account state, and there is a mapping relationship between the account address of the same account and the updated account state thereof, so that when the block coming node accesses the first world state subsequently, according to the account address of an account, an updated account state corresponding to the account can be quickly acquired in the account state mapping. At the same time, the dirty account addresses set of the initial update state will contain the account addresses of the accounts whose state data is updated after the transactions in the initial block are executed. With the dirty account address set and the account state mapping of the initial update state, it is time to construct the clean present world state tree corresponding to the initial update state.

At this moment, the world state tree in the initial update state is empty, which means that the world state tree in the initial update state has not yet been constructed, and the block coming node will find the second world state based on the first previous world state pointer in the initial update state, first obtain the clean world state tree of the second world state as a clean previous world state tree, and then construct a second world state tree corresponding to the initial update state according to the first tree node cache and the present state tree root, and add the second world state tree to the initial update state to obtain a transition initial update state; Chain-wide dirty account state committing processing is performed on the transition initial update state to obtain the updated first world state S103: Write a first world state root corresponding to the clean present world state tree into the initial block to obtain a to-be-on-chained block, and transmit a consensus block to consensus nodes to cause the consensus node to perform consensus processing on the to-be-on-chained block based on the first world state root to obtain a consensus result. In some implementations, S103 may include adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result.

The first world state root corresponding to the clean present world state tree is a hash value of the root of the clean present world state tree, and at this moment, the first world state root can be used as a state snapshot of the state data contained in all accounts in the blockchain network after the execution of the initial block. After the first world state root is written to the initial block, the block coming node packs the block and then the to-be-on-chained block is obtained. Next, the block coming node transmits the to-be-on-chained block to the consensus node in the blockchain network via a Peer to Peer (P2P) network, then, the consensus node can first construct the world state corresponding to the to-be-on-chained block, then perform the above process of S102 to S103 on the constructed world state to obtain the clean present world state tree corresponding to the constructed world state, and then acquire the hash value of the tree root thereof to serve as a check world state root. The consensus node will compare the check world state root with the first world state root in the to-be-on-chained block, and if the check world state root and the first world state root in the to-be-on-chained block are the same, check passes; If the check world state root and the first world state root in the to-be-on-chained block are different, check fails, and the consensus of the to-be-on-chained block fails.

S104: Write the to-be-on-chained block into a blockchain when the consensus result is a consensus pass result, commit the updated first world state to the latest on-chain world state step by step via the world state chain, and determine the updated first world state as a new consensus root world state, the new consensus root world state having a chained relationship pointing to the committed latest on-chain world state. In some implementations, S104 may include in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

If the to-be-on-chained block is approved by consensus, the block coming node and other blockchain nodes in the blockchain network will write the to-be-on-chained block into the blockchain. As mentioned above, after the new block is on-chained, the latest on-chain world state will also be updated, and the block coming node needs to commit the updated first world state to the latest on-chain world state in the order of the world state chain. After the committing is completed, the updated first world state will be determined as a new consensus root world state, at this moment, the first previous world state pointer in the new consensus root world state will point from the world state corresponding to the parent block thereof to the latest on-chain world state, and the first previous tree node cache pointer in the new consensus root world state will also point to the previous tree node cache in the latest on-chain world state. For example, in the world state chain shown in FIG. 2C above, the block coming node 22 may commit the world state n+1 to the consensus root world state after consensus of the block n+1 is passed, and then the committed consensus root world state is committed to the latest on-chain world state to obtain the committed latest on-chain world state. Once committing is completed, the world state n+1 will be confirmed as the new consensus root world state, and the original chained relationship pointing to the consensus root world state will be updated to a chained relationship pointing to the committed latest on-chain world state. The storage address of the committed latest on-chain world state still remains the same as the latest on-chain world state, and the committed latest on-chain world state is used for characterizing the world state after the execution of the transactions within the block n+1. In some implementations, the original consensus root world state can then be deleted.

In one possible embodiment, after the updated first world state is finally committed to the latest on-chain world state, the block coming node also needs to commit the committed latest on-chain world state to the tree node storage, which can also be considered to be committed to the tree node database since the tree node storage belongs to the key value database, and the specific process can be as follows. (a) Perform chain-wide dirty account state committing processing on the committed latest on-chain world state to obtain a clean latest on-chain world state, with the tree node cache in the clean latest on-chain world state including first tree node mapping. Update the tree node hash and the tree node contained in the first tree node mapping to the tree node database. Empty the dirty account address set, the account state mapping and the first tree node mapping in the clean latest on-chain world state.

Figure 4A:
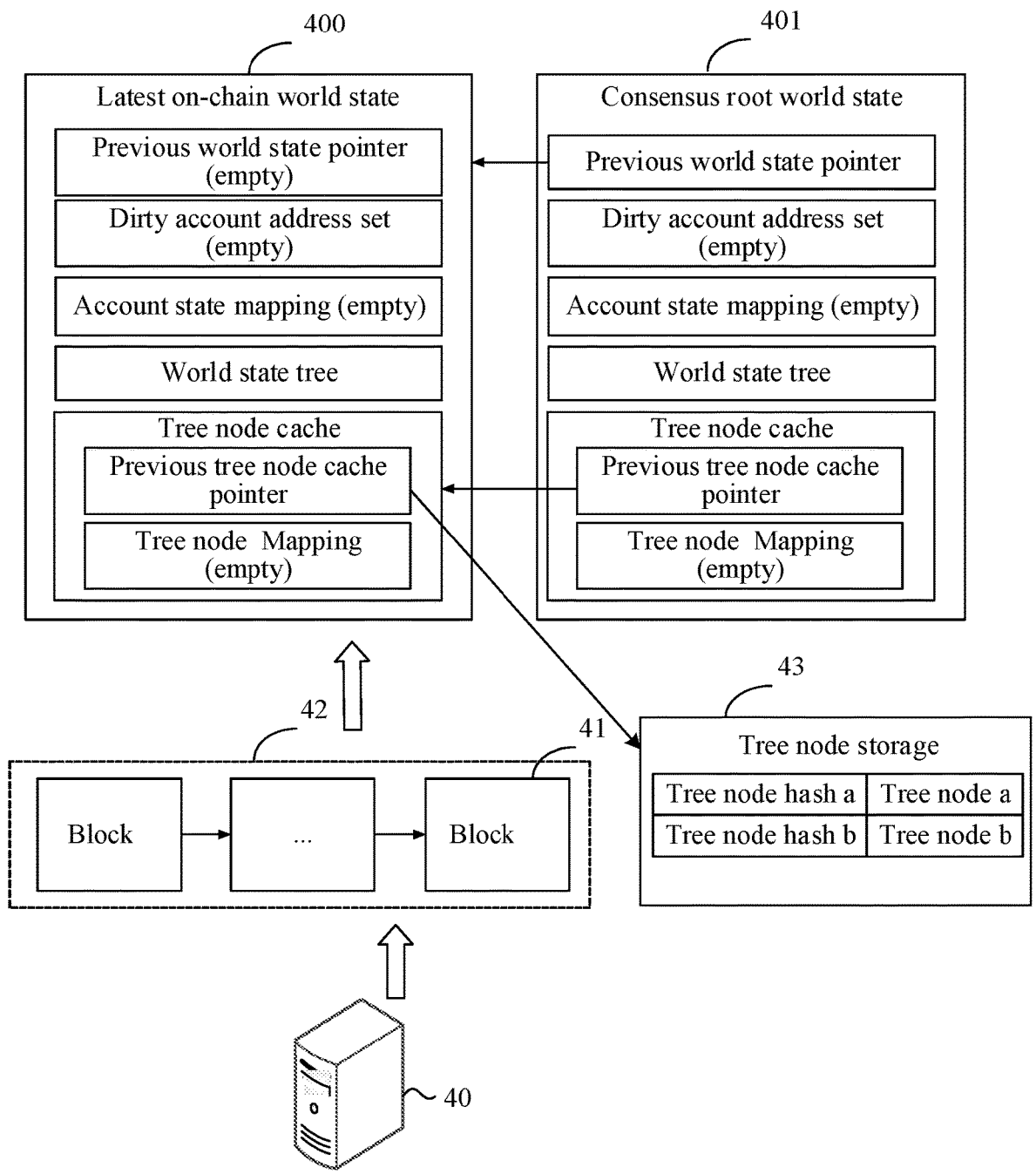
FIG. 4A-FIG. 4C are schematic diagrams of blockchain-based scenarios for processing data according to an embodiment of the present disclosure.
Figure 4B:
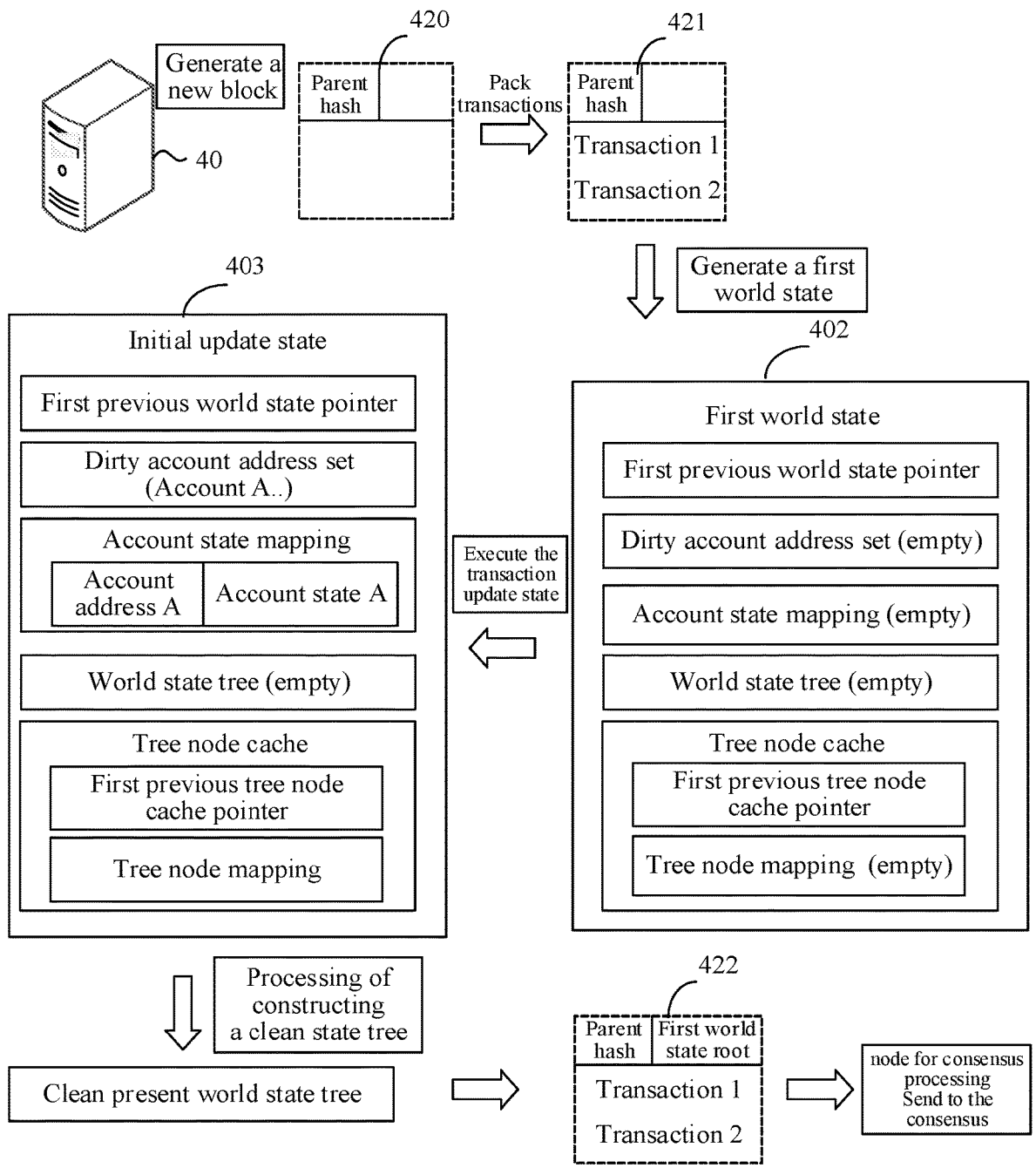
Figure 4C:
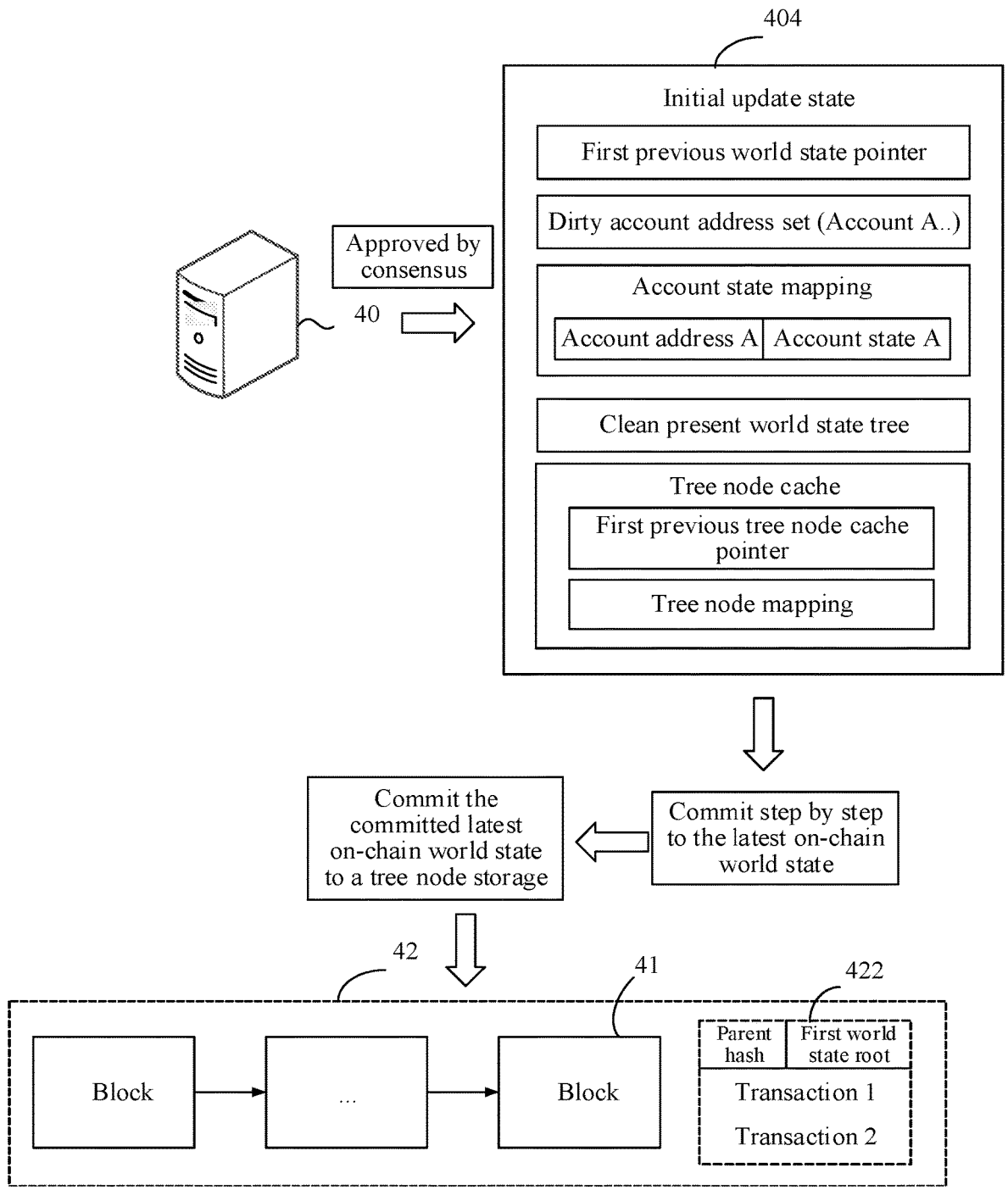

To facilitate understanding the above process, please refer to FIG. 4A to FIG. 4C together, and FIG. 4A-FIG. 4C are schematic diagrams of blockchain-based scenarios for processing data according to an embodiment of the present disclosure. As shown in FIG. 4A, in a block coming node 40 (which can be the block coming node 22 shown in FIG. 2C above), a block 41 is a latest on-chained block in a blockchain 42, then a latest on-chain world state 400 records the view of the state data corresponding to all accounts in the blockchain network after a block 42 is on-chained, at this moment, except for a previous world state pointer which is empty, a dirty account address set, an account state mapping and a tree node mapping in the latest on-chain world state 400 are all empty sets. A world state tree in the latest on-chain world state 400 is a world state tree corresponding to all the state data in the blockchain at this moment, and the previous tree node cache pointer of the latest on-chain world state 400 points to a tree node storage 43. It will be appreciated that each tree node in the world state tree of the latest on-chain world state 400 and the tree node hash corresponding to the tree node are both stored in the tree node storage 43. In addition, the internal memory of the block coming node 40 also contains a consensus root world state 402, the consensus root world state 402 is in fact the corresponding world state after committing the consensus of the block 41, and the previous world state thereof is the latest on-chain world state 400, as can be seen from FIG. 4A, the previous world state pointer of the consensus root world state 402 points to the latest on-chain world state 400, and the previous tree node cache pointer of the consensus root world state 402 points to a tree node cache 4005.

To facilitate better illustration of this method, please refer to FIG. 4B together. Assume that there are no blocks under consensus at this moment. Upon receiving a block coming command, the block coming node 40 will generate a new block 420 with the block 41 as a parent block, and the parent hash contained in the new block 420 is the hash value of the block 41, and then the block coming node 40 packs some of the transactions in the transaction pool into the new block 420 so as to obtain an initial block 421, and subsequently, the block coming node 40 can construct the first world state 402 corresponding to the initial block 421, and the first world state in the first world state 402 will point to a second world state corresponding to the parent block of the initial block 421, because the parent block of the initial block 421 is an on-chained block, so the corresponding second world state thereof is actually a consensus root world state 401, and the first previous world state pointer of the first world state 402 points to the consensus root world state 401, and the first previous tree node cache pointer points to the tree node cache of the consensus root world state 401. At this moment, other compositions of the first world state 402, such as the dirty account address set, the world state tree, etc., are all empty sets. The block coming node 40 then executes the transactions in the initial block 421, and then during the execution of the transactions in the initial block 421, the first world state 402 is updated to obtain an initial update state 403, where update means that the account addresses of accounts required to be updated and the updated account states are written into the account state mapping of the first world state 402, and the account addresses of the accounts required to be updated are added into the dirty account address set of the first world state 402. For example, after transaction 1 is executed, the state data of account A will be changed, so the account state of account A will be updated accordingly. Assuming that the updated account state is account state A, the block coming node 40 will write account address A corresponding to account A to the dirty account address set of the first world state 402, and then add the mapping relationship between the account address A and the account state A to the account state mapping of the first world state 402. After all the transactions in the initial block 421 have been executed, the initial update state 403 is obtained. At this moment, the world state tree of the initial update state 403 has not yet been constructed, and then the block coming node 40 will construct the initial update state 403 for the processing of constructing a clean world state tree to obtain a clean present world state tree, and finally, the block coming node will add a state tree root corresponding to the clean present world state tree as a first world state root into the initial block 421 to obtain a to-be-on-chained block 422. Subsequently, the block coming node can send the to-be-on-chained block 422 to the consensus node in the blockchain network, and let the consensus node perform consensus on the to-be-chained block 422 based on the first world state root to obtain a consensus result.

Please refer to FIG. 4C together. As shown in FIG. 4C, when the consensus result is the consensus pass result, the world state corresponding to the to-be-on-chained block 422 in the block coming node 40 is an updated first world state 404 containing the clean present world state tree, and the block coming node 40 will gradually commit the updated first world state 404 to the latest on-chain world state, i.e., the updated first world state 404 is first committed to the consensus root world state 401, and then the committed consensus root world state is committed to the latest on-chain world state 400, and finally the committed latest on-chain world state is committed to the tree node storage 43, and the to-be-on-chained block 422 will also be written into the blockchain 42 to become the latest on-chained block. At this moment, the updated first target time state 404 will be used as a new consensus root world state, and the block coming node 40 will point the first previous world state pointer thereof to the committed latest on-chain world state and the first previous tree node cache pointer thereof to the tree node cache of the committed latest on-chain world state.

With the method provided by the embodiment of the present disclosure, there is no need to record the old value of the state data change when updating the state data during the execution of the block, and there is no need to perform a rollback operation of the state data for transactions that fail to execute, saving the system overhead.

Figure 5:
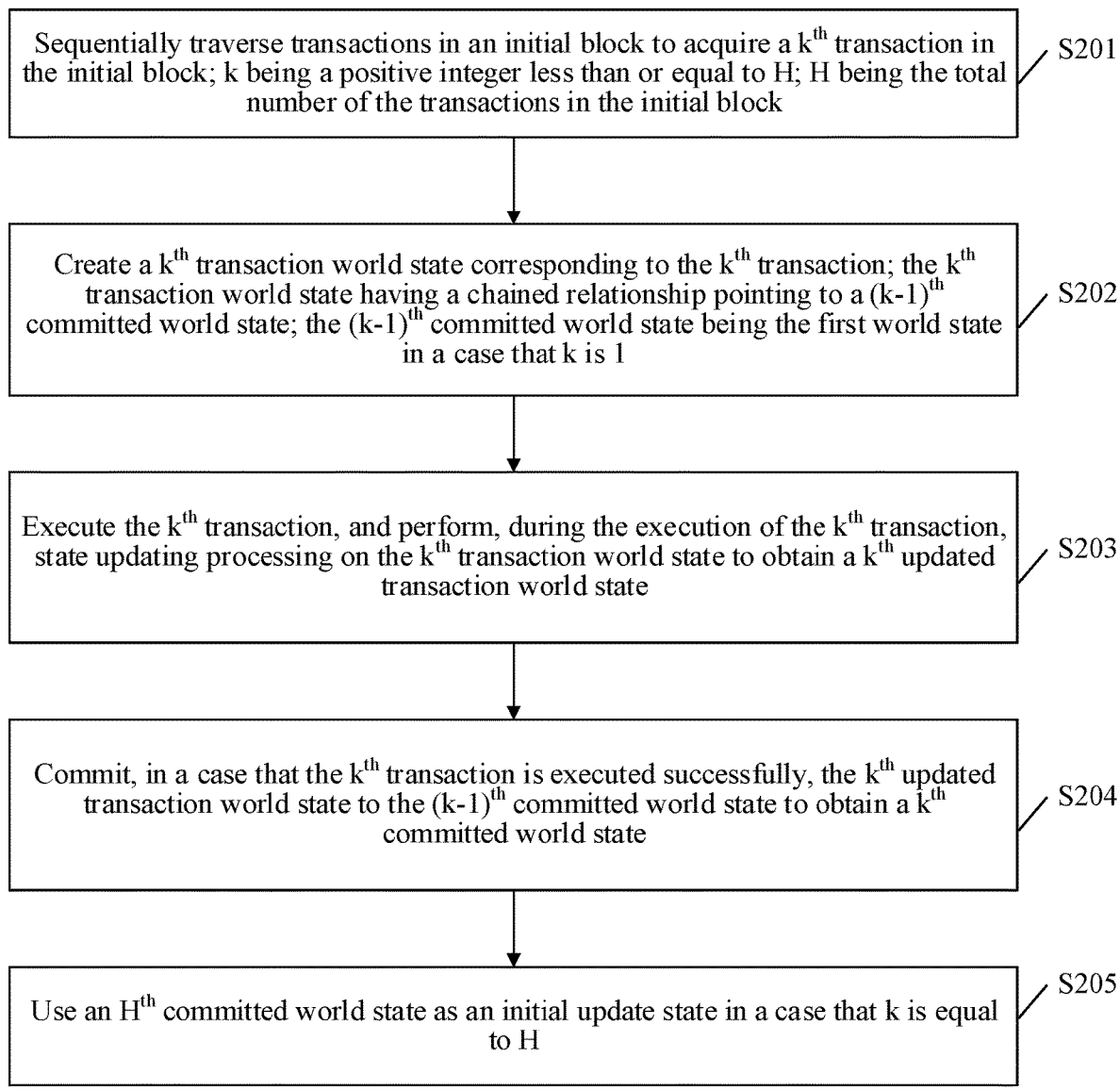
FIG. 5 is a schematic flowchart of a transaction-based method for updating a first world state according to an embodiment of the present disclosure.

Please refer to FIG. 5, and FIG. 5 is a schematic flowchart of a transaction-based method for updating a first world state according to an embodiment of the present disclosure. The update method is a feasible implementation method described in S102 in the embodiment corresponding to FIG. 3 above for updating the first world state based on the transactions in the initial block to obtain an initial update state. The method may also be executed by a block coming node (e.g., any blockchain node in the blockchain node system 10 in the embodiment corresponding to FIG. 1 above). The method will be illustrated below as an example of the method being executed by the block coming node, where the method for updating the first world state may at least include S201-S205 as follows.

S201. Sequentially traverse transactions in the initial block to acquire a $k^{th}$ transaction in the initial block; k being a positive integer less than or equal to H; H being the total number of the transactions in the initial block.

When the initial block contains a plurality of transactions, the block coming node traverses the initial block to sequentially acquire the first transaction, then executes the first transaction, then updates the first world state based on the execution result of the first transaction to obtain the first committed world state, then acquires the second transaction, executes the second transaction, then updates the first committed world state based on the execution result of the second transaction to obtain the second committed world state, and so on, until all the transactions in the initial block are processed, and the initial update state is obtained. For ease of understanding, the example of processing the $k^{th}$ transaction is used for illustration.

S202: Create a $k^{th}$ transaction world state corresponding to the $k^{th}$ transaction; the $k^{th}$ transaction world state having a chained relationship pointing to a $(k-1)^{th}$ committed world state; the $(k-1)^{th}$ committed world state being the first world state when k is 1.

The block coming node will first create the $k^{th}$ transaction world state corresponding to the $k^{th}$ transaction, and for the $k^{th}$ transaction world state, the previous world state thereof will be the $(k-1)^{th}$ committed world state, and at this moment, the creation of the $k^{th}$ transaction world state can refer to the creation process of the first world state in S101 above, and will not be repeated here. The $k^{th}$ transaction world state has a chained relationship pointing to the $(k-1)^{th}$ committed world state. It will be appreciated that for the first transaction, the previous world state thereof is then the first world state.

S203: Execute the $k^{th}$ transaction, and perform, during the execution of the $k^{th}$ transaction, state updating processing on the $k^{th}$ transaction world state to obtain a $k^{th}$ updated transaction world state.

As can be seen from the structure of the account state shown in FIG. 2B above, the $k^{th}$ transaction world state may contain account state mapping and a dirty account address set, but the account state mapping and the dirty account address set of the $k^{th}$ transaction world state are both empty at this moment. During the execution of the $k^{th}$ transaction, the block coming node may need to read or update the state data of an account when executing the smart contract under transaction, at this moment, the block coming node determines to-be-queried data or to-be-updated data. The to-be-queried data may contain a to-be-queried account address and a to-be-queried state data key. The to-be-updated data may include a to-be-updated account address, a to-be-updated state data key and a to-be-updated state data value. The block coming node may perform state updating processing on the $k^{th}$ transaction world state based on the to-be-updated data, or perform query processing on the $k^{th}$ transaction world state based on the to-be-queried data.

In one possible embodiment, the $k^{th}$ transaction is executed and state updating processing is performed on the $k^{th}$ transaction world state during the execution of the $k^{th}$ transaction, and a feasible implementation process of obtaining a $k^{th}$ updated transaction world state is: executing the $k^{th}$ transaction, determining during the execution of the $k^{th}$ transaction the to-be-updated data corresponding to the $k^{th}$ transaction, i.e., the to-be-updated account address, the to-be-updated state data key and the to-be-updated state data value as described above, and then obtaining the account state corresponding to the to-be-updated account address as the to-be-updated account state according to the $k^{th}$ transaction world state; updating the mapping relationship of the to-be-updated state data key and the to-be-updated state data value into to-be-updated state data mapping and inserting the to-be-updated state data key into a to-be-updated dirty state data key set to obtain a present account state; updating the mapping relationship of the to-be-updated account address and the present account state into the account state mapping contained in the $k^{th}$ transaction world state, and inserting the to-be-updated account address into the dirty account address set contained in the $k^{th}$ transaction world state to obtain the $k^{th}$ updated transaction world state.

In one possible embodiment, a feasible implementation process of acquiring the account state corresponding to the to-be-updated account address based on the $k^{th}$ transaction world state as the to-be-updated account state is: performing account state mapping sequence search from the $k^{th}$ transaction world state to the latest on-chain world state based on the to-be-updated account address; when an account state having a mapping relationship with the to-be-updated account address is found during the account state mapping sequence search, taking the first found account state having a mapping relationship with the to-be-updated account address as the to-be-updated account state; when the account state having a mapping relationship with the to-be-updated account address is not found during the account state mapping sequence search, acquiring a to-be-updated state tree root corresponding to the to-be-updated account address according to a world state tree in the latest on-chain world state, and establishing the to-be-updated account state according to the to-be-updated account address and the to-be-updated state tree root. Specifically, a method for the block coming node to acquire the to-be-updated account state based on the $k^{th}$ transaction world state is that whether an account state having a mapping relationship with the to-be-updated account address exists is first searched in the account state mapping of the $k^{th}$ transaction world state, and if the account state exists, the account state is used as the to-be-updated account state and the subsequent query search stops; if the account state does not exist, the previous world state of the $k^{th}$ transaction world state is acquired according to the previous world state pointer of the $k^{th}$ transaction world state, that is, a $(k-1)^{th}$ committed world state, and then the block coming node continues to search for the account state mapping of the $(k-1)^{th}$ committed world state to see whether an account state having a mapping relationship with the to-be-updated account address exists, and if the account state exists, the account state is directly acquired and the subsequent query search stops; if the account state does not exist, operation continues to acquire the previous world state, and so on, until the block coming node finds the account state mapping of the latest on-chain world state; if no account state having a mapping relationship with the to-be-updated account address exists in the account state mapping of the latest on-chain world state, it can be seen from above that there is no previous world state in the latest on-chain world state, and then the block coming node can search an account state root corresponding to the to-be-updated address from the world state tree of the latest on-chain world state according to the to-be-updated account address; then, an account state is new created in the internal memory, and the account address of the new created account state is initialized to the to-be-updated account address, the account state root of the new created account state is initialized to a found account state root, and then the initialized new created account state is used as the to-be-updated account state.

In one possible embodiment, a feasible implementation process of executing the $k^{th}$ transaction and performing query processing on the $k^{th}$ transaction world state during the execution of the $k^{th}$ transaction is: executing the $k^{th}$ transaction, determining the to-be-queried data corresponding to the $k^{th}$ transaction during the execution of the $k^{th}$ transaction, i.e., the to-be-queried account address and the to-be-queried state data key as described above, and then, based on the to-be-queried account address, performing search in the account state mapping of the $k^{th}$ transaction world state, and if the account state corresponding to the to-be-queried account address is obtained by the search, continuing the search, based on the to-be-queried state data key, in the account state obtained by the search, and if the state data value corresponding to the to-be-queried state data key is obtained by the search, returning the state data value as a result without further search; if the state data value corresponding to the to-be-queried state data key is not found, or if the account state corresponding to the to-be-queried account address is not found in the account state mapping of the $k^{th}$ transaction world state, determining whether a previous world state exists based on the previous world state pointer of the $k^{th}$ transaction world state. If the previous world state pointer of the $k^{th}$ transaction world state exists, the $k^{th}$ transaction world state is acquired according to the previous world state pointer, i.e., the $(k-1)^{th}$ committed world state mentioned above, and then operation continues to search the $(k-1)^{th}$ committed world state according to the to-be-queried address and the to-be-queried state data key, and if the state data value corresponding to the to-be-queried state data key is found in the $(k-1)^{th}$ committed world state, the subsequent search stops; if the state data value corresponding to the to-be-queried state data key is not searched in the $(k-1)^{th}$ committed world state, operation continues to determine whether a previous world state exists according to the previous world state pointer of the $(k-1)^{th}$ committed world state. And so on, if the latest on-chain world state is found all the time, the state data value corresponding to the to-be-queried state data key is not acquired from the account state mapping in the latest on-chain world state, the account state root corresponding to the to-be-updated address is searched from the world state tree of the latest on-chain world state, and then an account state is new created in the internal memory, and the account address of the new created account state is initialized to the to-be-updated account address, the account state root of the new created account state is initialized to the found account state root, and then the initialized new created account state is used as the to-be-queried account state. If the account state root of the to-be-queried account state is empty, the state data value corresponding to the to-be-queried state data key is determined to be empty and the subsequent search stops. If the account state root of the to-be-queried account state is not empty, but the account state tree of the to-be-queried account state is empty, with the tree node cache of the latest on-chain world state used as the tree node query source, and the account state root of the to-be-queried account state used as the state tree root, an account state tree is new created in the internal memory and added into the to-be-queried account state; then the state data value is searched from the account state tree of the to-be-queried account state based on the to-be-queried state data key, and search ends.

S204: Commit, when the $k^{th}$ transaction is executed successfully, the $k^{th}$ updated transaction world state to the $(k-1)^{th}$ committed world state to obtain a $k^{th}$ committed world state.

In one possible embodiment, if the $k^{th}$ transaction is executed successfully, a feasible implementation process of committing the $k^{th}$ updated transaction world state to the $(k-1)^{th}$ committed world state to obtain the $k^{th}$ committed world state is: traversing account addresses in the dirty account address set contained in the $k^{th}$ updated transaction world state to sequentially acquire a $j^{th}$ account address; j being a positive integer less than or equal to I; I being the total number of the account addresses in the dirty account address set contained in the $k^{th}$ updated transaction world state; acquiring a present account state corresponding to the $j^{th}$ account address from the account state mapping contained in the $k^{th}$ updated transaction world state; acquiring the previous account state of the $j^{th}$ account address from the $(k-1)^{th}$ committed world state; committing the present account state corresponding to the $j^{th}$ account address to the previous account state of the $j^{th}$ account address, and inserting the $j^{th}$ account address into the dirty account address set contained in the $(k-1)^{th}$ committed world state to obtain a $j^{th}$ transition committed world state; when j is equal to I, emptying the dirty account address set and the account state mapping contained in the $k^{th}$ updated transaction world state, and using an $I^{th}$ transition committed world state as a $k^{th}$ committed world state. The process of acquiring the previous account state of the $j^{th}$ account address based on the $(k-1)^{th}$ committed world state can be: performing search in the account state mapping in the $(k-1)^{th}$ committed world state based on the $j^{th}$ account address, if an account state having a mapping relationship with the $j^t$ account address is obtained by the search, using same as a reference account state, then new creating an account state in the internal memory and initializing the account address and account state root of the account state new created just based on the account address and account state root of the reference account state, and using the account state new created just as the previous account state of the $j^{th}$ account address; if an account state having a mapping relationship with the $j^{th}$ account address is not found, continuing to perform search in the account state mapping of the previous world state of the $(k-1)^{th}$ committed world state, and continuing the above search process; if the account state mapping of the latest on-chain world state is found all the time, but an account state having a mapping relationship with the $j^{th}$ account address is not found, performing search in the world state tree of the latest on-chain world state to obtain an account state root corresponding to the $j^{th}$ account address; then new creating an account state in the internal memory, and initializing the account address and account state root of the account state new created just based on the $j^{th}$ account address and the account state root obtained from the world state tree, and using the account state new created just as the previous account state of the $j^{th}$ account address.

In one possible embodiment, the present account state corresponding to the $j^{th}$ account address contains first state data mapping, the previous account state of the $j^{th}$ account address contains second state data mapping, the present account state corresponding to the $j^{th}$ account address is committed to the previous account state of the $j^{th}$ account address, and the $j^{th}$ account address is inserted into the dirty account address set contained in the $(k-1)^{th}$ committed world state to obtain a feasible implementation process of the $j^{th}$ transition committed world state: updating the mapping relationship of the state data key and the state data value in the first state data mapping into the second state data mapping; and inserting state data keys in the first state data mapping into the dirty state data key set contained in the previous account state of the $j^{th}$ account address to obtain the $j^{th}$ transition committed world state.

S205: Use an $H^{th}$ committed world state as the initial update state when k is equal to H.

Generally, the initial update state will contain the account address that needs to be updated after all the transactions within the initial block are executed and the account state after the account address is updated, and the dirty account address set of the initial update state will contain all the account addresses that need to be updated.

Figure 6:
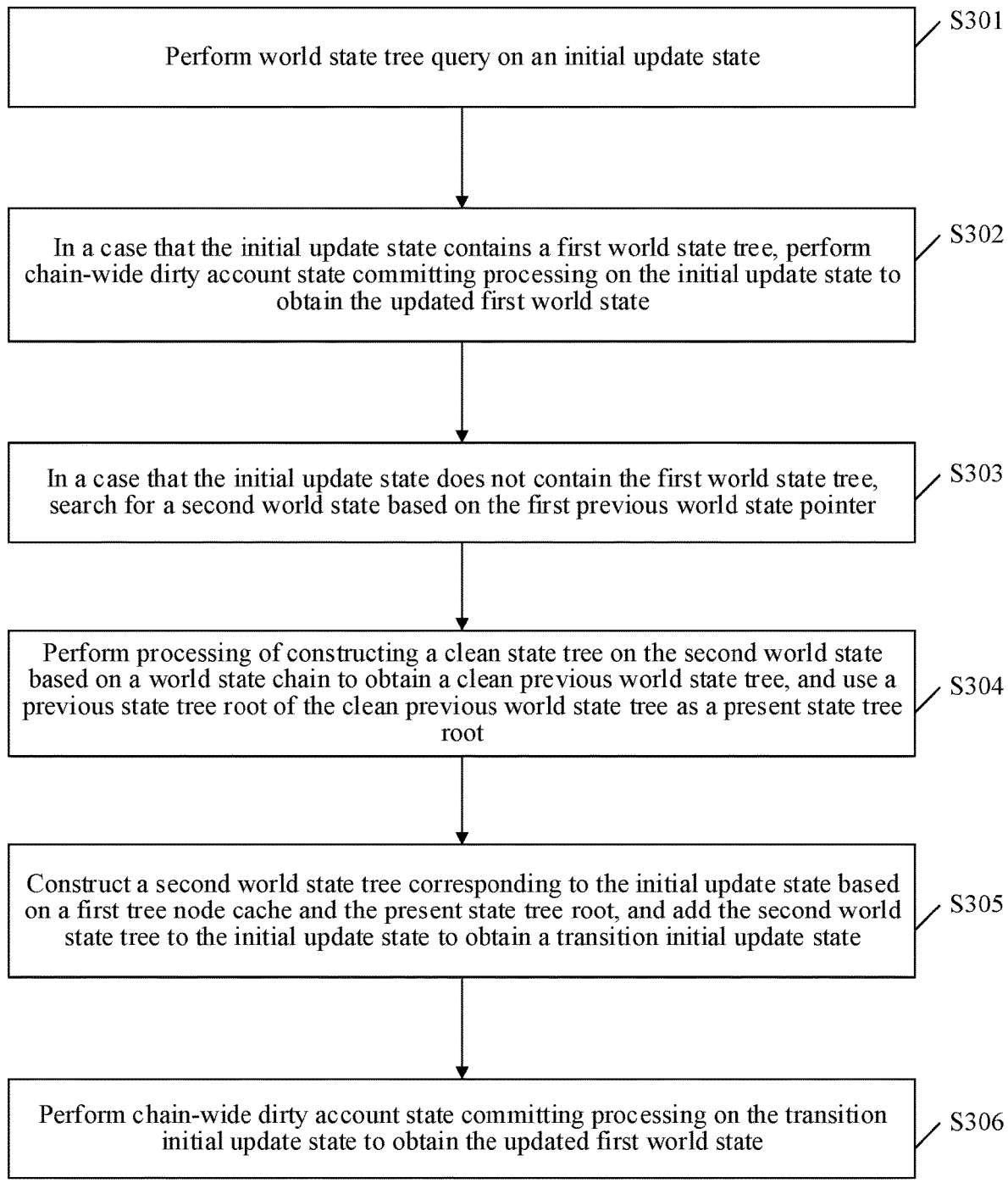
FIG. 6 is a schematic flowchart of a method for constructing a clean world state tree according to an embodiment of the present disclosure.

Please refer to FIG. 6, and FIG. 6 is a schematic flowchart of a method for constructing a clean world state tree according to an embodiment of the present disclosure. The method for constructing a clean world state tree is a feasible implementation method described in S102 in the embodiment corresponding to FIG. 3 above for performing processing of constructing a clean state tree on the initial update state based on the world state chain to obtain an updated first world state containing a clean present world state tree. The method may also be executed by a block coming node (e.g., any blockchain node in the blockchain node system 10 in the embodiment corresponding to FIG. 1 above). The method will be illustrated below as an example of the method being executed by the block coming node, where the method for constructing a clean world state tree may at least include S301-S306 as follows.

S301: Perform world state tree query on an initial update state.

All the world states managed by the block coming node can construct a clean world state tree corresponding thereto. The method for constructing a clean world state tree is applicable to all the world states, but some world states may already contain a world state tree, so in the method for constructing a clean world state tree, it is necessary to first determine whether the world state that needs to construct a clean world state tree contains a world state tree. When the block coming node performs the processing of constructing a clean world state tree on the initial update state, the block coming node performs world state tree query on the initial update state.

S302: when the initial update state contains a first world state tree, perform chain-wide dirty account state committing processing on the initial update state to obtain the updated first world state.

If the initial update state contains the first world state tree, the block coming node will directly perform the chain-wide dirty account state committing processing on the initial update state to obtain an updated first world state containing a clean present world state tree. The committing process can refer to in S306 below and will not be described in detail herein.

S303: Search for, when the initial update state does not contain the first world state tree, a second world state based on the first previous world state pointer.

If the initial update state does not contain the first world state tree, the block coming node may perform query forward one by one according to the world state chain to construct a second world state tree of the initial update state by relying on the clean world state of previous world states in the world state chain. First, the block coming node first acquires the previous world state of the initial update state, i.e., the second world state, based on a first previous world state pointer, and then first acquires the clean present world state tree corresponding to the second world state as a clean previous world state tree.

S304: Perform processing of constructing a clean state tree on the second world state based on the world state chain to obtain the clean previous world state tree, and use the previous state tree root of the clean previous world state tree as a present state tree root.

The block coming node will perform processing of constructing a clean state tree on the second world state, i.e., perform the processing process of S301-S306 on the second world state to obtain a clean present world state tree corresponding to the second world state, which will then be used as the clean previous world state tree of the initial update state. The block coming node then takes the previous state tree root of the clean previous world state tree as the present state tree root.

S305: Construct a second world state tree corresponding to the initial update state based on a first tree node cache and the present state tree root, and add the second world state tree to the initial update state to obtain a transition initial update state.

The block coming node will use the first tree node cache as a tree node query source and then construct the second world state tree corresponding to the initial update state based on the present state tree root, at this moment, the updated account state corresponding to the account address in the dirty account address set of the initial update state has not yet been committed and therefore needs to be committed to obtain a clean second world state tree, i.e., the clean present world state tree.

S306: Perform chain-wide dirty account state committing processing on the transition initial update state to obtain the updated first world state.

Generally, after either the first world state tree or the second world state tree corresponding to the initial update state is acquired, the block coming node will perform chain-wide dirty account state committing processing. In response to the transition initial update state containing the second world state tree, the block coming node sequentially traverses the world state chain to acquire the dirty account address set contained in an $x^{th}$ world state as an $x^{th}$ dirty account address set; x being a positive integer less than or equal to Z; Z being the sequential ordinal number of the transition initial update state in the world state chain; traverse the account addresses in the $x^{th}$ dirty account address set to acquire an $m^{th}$ account address in sequence; m being a positive integer less than or equal to the total number of account addresses in the $x^{th}$ dirty account address set; acquire a present account state and a previous account state corresponding to the $m^{th}$ account address; perform account dirty state data committing processing on the present account state of the $m^{th}$ account address based on the previous account state of the $m^{th}$ account address; obtain an $x^{th}$ committed world state after account dirty state data committing processing is performed on the present account state of each dirty account address in the $x^{th}$ dirty account address set; add each dirty account address in the $x^{th}$ dirty account address set to an $(x-1)^{th}$ on-chain dirty account address set to obtain an $x^{th}$ on-chain dirty account address set; when x is 1, the $(x-1)^{th}$ on-chain dirty account address set being an empty set; and when x is equal to Z, take the $x^{th}$ on-chain dirty account address set as a chain-wide dirty account address set, and take the $x^{th}$ committed world state as the committed transition initial update state.

In one possible embodiment, a feasible implementation process of performing account dirty state data committing processing on the present account state of the $m^{th}$ account address according to the previous account state of the $m^{th}$ account address is: performing account state tree query on the present account state of the $m^{th}$ account address; if the present account state of the $m^{th}$ account address does not contain an account state tree, or the account state root of the present account state of the $m^{th}$ account address is not equal to the account state root of the previous account state of the $m^{th}$ account address, building a specified account state tree based on the tree node cache of the present account state of the $m^{th}$ account address and the account state root of the previous account state of the $m^{th}$ account address, adding the specified account state tree to the present account state of the $m^{th}$ account address, and updating the account state root of the present account state of the $m^{th}$ account address to the account state root of the previous account state of the $m^{th}$ account address to obtain a specified account state; if the present account state of the $m^{th}$ account address contains an account state tree and the account state root of the present account state of the $m^{th}$ account address is equal to the account state root of the previous account state of the $m^{th}$ account address, using the present account state of the $m^{th}$ account address as a specified account state; if the first dirty state data key set of the specified account state is not empty, acquiring state data values corresponding to dirty state data keys in the first dirty state data key set from the state data mapping of the specified account state, and updating the dirty state data keys in the first dirty state data key set and the state data values corresponding to the dirty state data keys in the first dirty state data key set to the account state tree of the specified account state to obtain the specified account state containing the updated account state tree; updating the account state root of the specified account state containing the updated account state tree to the state tree root of a to-be-updated account state tree; emptying the dirty state data key set of the specified account state containing the updated account state tree; storing the association relationship of the updated tree node hash of the updated account state tree and the updated tree node to the $x^{th}$ world state.

In one possible embodiment, a practical implementation of the above process may be: the block coming node can use the transition initial update state as the present world state, and then execute a method of "committing state data of a chain-wide dirty account" for the present world state, and the specific steps of the method are: determining whether a previous world state exists according to the previous world state pointer of the present world state, and if the previous world state exists, treating the previous world state as the present world state and continuing to execute the method of "committing state data of a chain-wide dirty account", and using the obtained chain-wide dirty account address set as an initial chain-wide dirty account address set; if the previous world state does not exist, new creating an empty initial chain-wide dirty account address set in the internal memory. After obtaining the initial chain-wide dirty account address set, the block coming node can traverse the dirty account address set of the present world state, and for each account address, the following operations are respectively executed: finding the account state from the account state mapping based on the account address as the present account state; determining whether a previous world state exists based on the previous world state pointer of the present world state, and if the previous world state exists, acquiring the previous account state in the previous world state based on the account address, and if the previous world state does not exist, using the present account state as the previous account state at the same time; using the account state root of the previous account state as the previous account state root and executing a method of "committing state data of a single account" according to the tree node cache of the present world state with the present account state as the specified account state; then inserting the account address into the processed chain-wide dirty account address set; after all the account addresses in the dirty account address set have completed the above operation, obtaining the chain-wide dirty account address set and the committed transition initial update state.

In one possible embodiment, the specific steps of using the account state root of the previous account state as the previous account state root and using the present account state as the specified account state according to the tree node cache of the present world state to execute the method of "committing state data of a single account" are: if the account state tree of the specified account state is not empty and the account state root of the specified account state is equal to the previous account state root, then skipping the step, otherwise with the tree node cache as the tree node query source, and the previous account state root as the state tree root, new creating an account state tree in the internal memory and adding same to the specified account state, and then updating the account state root of the specified account state to the previous account state root and continuing the following steps; returning operation and ending the process if the first dirty state data key set of the specified account state is empty, or continuing the following steps if the first dirty state data key set of the specified account state is not empty; traversing the first dirty state data key set of the specified account state, finding the state data values from the state data mapping of the specified account state based on each state data key, updating each pair of state data keys and state data values to the account state tree of the specified account state and continuing the following steps; using the tree node cache as a tree node update cache to perform a commit operation on the account state tree of the specified account state, and continuing the following steps; acquiring the state root of the account state tree of the specified account state and updating same to the account state root of the specified account state; emptying the first dirty state data key set of the specified account state.

By the method provided by the embodiment of the present disclosure, the consistency of the state data of the blockchain system can be ensured by constructing the world state chain to simultaneously maintain the world state of different block heights or different branches of the same block height, which is compatible with the consensus mechanism that requires simultaneous consensus of multiple blocks.

Figure 7:
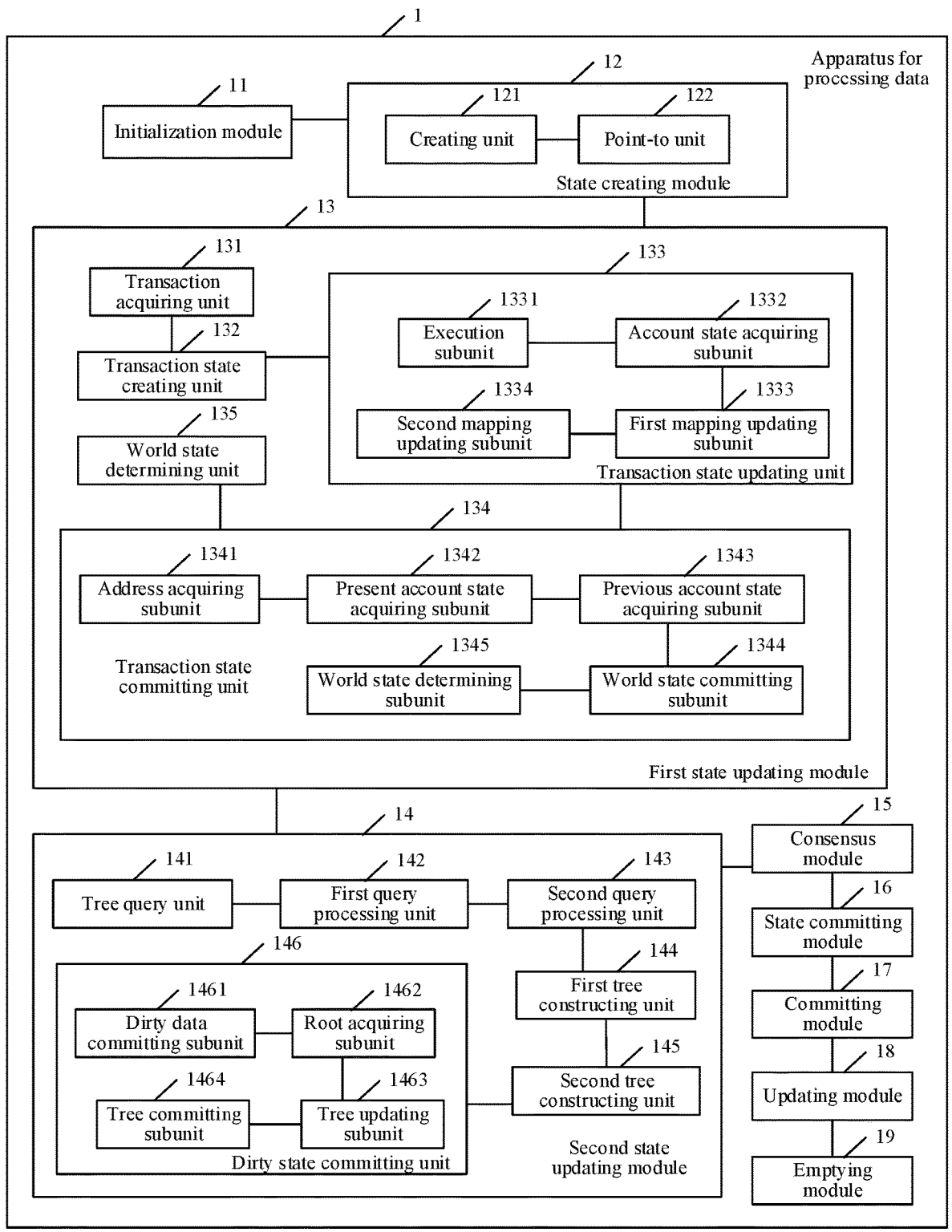
FIG. 7 is a schematic structural diagram of a blockchain-based apparatus for processing data according to an embodiment of the present disclosure.

Please refer to FIG. 7 and FIG. 7 is a schematic structural diagram of a blockchain-based apparatus for processing data according to an embodiment of the present disclosure. The apparatus for processing data can be a computer program (including program codes) running in a computer device, for example, the apparatus for processing data is an application software; the apparatus may be used for executing the corresponding steps in the method for processing data provided in the embodiments of the present disclosure. As shown in FIG. 7, the apparatus 1 for processing data may include: an initialization module 11, a state creating module 12, a first state updating module 13, a second state updating module 14, a consensus module 15 and a state committing module 16.

The initialization module 11 is configured to generate an initial block;

the state creating module 12 is configured to create a first world state corresponding to the initial block; the first world state having a chained relationship pointing to a second world state, the second world state being a world state corresponding to a parent block of the initial block; the first world state and the second world state existing in a world state chain; the second world state being a consensus root world state when the parent block is a block with the largest block height in on-chained blocks; the first world state in the world state chain being a latest on-chain world state; the consensus root world state having a chained relationship pointing to the latest on-chain world state; the latest on-chain world state being used for recording a latest world state corresponding to the on-chained block;

the first state updating module 13 is configured to update the first world state according to transactions in the initial block to obtain an initial update state;

the second state updating module 14 is configured to perform processing of constructing a clean state tree on the initial update state according to the world state chain to obtain an updated first world state, the updated first world state including a clean present world state tree;

the consensus module 15 is configured to write a first world state root corresponding to the clean present world state tree into the initial block to obtain a to-be-on-chained block, and transmit a consensus block to consensus nodes to cause the consensus node to perform consensus processing on the to-be-on-chained block based on the first world state root to obtain a consensus result;

the state committing module 16 is configured to write the to-be-on-chained block into a blockchain when the consensus result is a consensus pass result, commit the updated first world state to the latest on-chain world state step by step via the world state chain, and determine the updated first world state as a new consensus root world state, the new consensus root world state having a chained relationship pointing to the committed latest on-chain world state.

The specific modes of implementation of the initialization module 11, the state creating module 12, the first state updating module 13, the second state updating module 14, the consensus module 15 and the state committing module 16 may refer to the description of S101-S104 in the embodiment corresponding to FIG. 3 above, and will not be repeated herein.

The state creating module 12 includes: a creating unit 121 and a point-to unit 122.

The creating unit 121 is configured to create an initial world state corresponding to the initial block, the initial world state containing a first previous world state pointer and a first tree node cache, the first tree node cache containing a first previous tree node cache pointer;

the point-to unit 122 is configured to point the first previous world state pointer to a second world state corresponding to a parent block of the initial block, and point the first previous tree node cache pointer to a second tree node cache contained in the second world state to obtain the first world state corresponding to the initial block.

The specific modes of implementation of the creating unit 121 and the point-to unit 122 may refer to the description of S101 in the embodiment corresponding to FIG. 3 above, and will not be repeated herein.

The first state updating module 13 includes: a first transaction acquiring unit 131, a transaction state creating unit 132, a transaction state updating unit 133, a transaction state committing unit 134 and a world state determining unit 135.

The first transaction acquiring unit 131 is configured to sequentially traverse transactions in the initial block to acquire a $k^{th}$ transaction in the initial block; k being a positive integer less than or equal to H; H being the total number of the transactions in the initial block;

the transaction state creating unit 132 is configured to create a $k^{th}$ transaction world state corresponding to the $k^{th}$ transaction, the $k^{th}$ transaction world state having a chained relationship pointing to a $(k-1)^{th}$ committed world state; the $(k-1)^{th}$ committed world state being the first world state when k is 1;

the transaction state updating unit 133 is configured to execute the $k^{th}$ transaction, and perform, during the execution of the $k^{th}$ transaction, state updating processing on the $k^{th}$ transaction world state to obtain a $k^{th}$ updated transaction world state;

the transaction state committing unit 134 is configured to commit, when the $k^{th}$ transaction is executed successfully, the $k^{th}$ updated transaction world state to the $(k-1)^{th}$ committed world state to obtain a $k^{th}$ committed world state;

the world state determining unit 135 is configured to use an H, committed world state as the initial update state when k is equal to H.

The specific modes of implementation of the first transaction acquiring unit 131, the transaction state creating unit 132, the transaction state updating unit 133, the transaction state committing unit 134 and the world state determining unit 135 may refer to the description of S201-S205 in the embodiment corresponding to FIG. 5 above, and will not be repeated herein.

The $k^{th}$ transaction world state contains account state mapping and a dirty account address set.

The transaction state updating unit 133 includes: an execution subunit 1331, an account state acquiring subunit 1332, a first mapping updating subunit 1333 and a second mapping updating unit 1334.

The execution subunit 1331 is configured to execute the $k^{th}$ transaction, and determine to-be-updated data corresponding to the $k^{th}$ transaction during the execution of the $k^{th}$ transaction, the to-be-updated data including a to-be-updated account address, a to-be-updated state data key and a to-be-updated state data value.

the account state acquiring subunit 1332 is configured to acquire an account state corresponding to the to-be-updated account address based on the $k^{th}$ transaction world state as a to-be-updated account state, the to-be-updated account state including to-be-updated state data mapping and a to-be-updated dirty state data key set;

the first mapping updating subunit 1333 is configured to update the mapping relationship of the to-be-updated state data key and the to-be-updated state data value into the to-be-updated state data mapping and inserting the to-be-updated state data key into the to-be-updated dirty state data key set to obtain a present account state;

the second mapping updating unit 1334 is configured to update the mapping relationship of the to-be-updated account address and the present account state into the account state mapping contained in the $k^{th}$ transaction world state, and inserting the to-be-updated account address into the dirty account address set contained in the $k^{th}$ transaction world state to obtain the $k^{th}$ updated transaction world state.

The account state acquiring subunit 1332 is configured to perform account state mapping sequence search from the $k^{th}$ transaction world state to the latest on-chain world state based on the to-be-updated account address; when an account state having a mapping relationship with the to-be-updated account address is found during the account state mapping sequence search, take the first found account state having a mapping relationship with the to-be-updated account address as the to-be-updated account state; when an account state having a mapping relationship with the to-be-updated account address is not found during the account state mapping sequence search, acquire a to-be-updated state tree root corresponding to the to-be-updated account address according to a world state tree in the latest on-chain world state, and establish the to-be-updated account state according to the to-be-updated account address and the to-be-updated state tree root.

The specific modes of implementation of the execution subunit 1331, the account state acquiring subunit 1332, the first mapping updating subunit 1333 and the second mapping updating unit 1334 may refer to the description of S203 in the embodiment corresponding to FIG. 5 above, and will not be repeated herein.

The transaction state committing unit 134 includes: an address acquiring subunit 1341, a present account state acquiring subunit 1342, a previous account state acquiring subunit 1343, a world state committing subunit 1344 and a world state determining subunit 1345.

The address acquiring subunit 1341 is configured to traverse account addresses in the dirty account address set contained in the $k^{th}$ updated transaction world state to sequentially acquire a $j^{th}$ account address; j being a positive integer less than or equal to I; I being the total number of the account addresses in the dirty account address set contained in the $k^{th}$ updated transaction world state;

the present account state acquiring subunit 1342 is configured to acquire a present account state corresponding to the $j^{th}$ account address from the account state mapping contained in the $k^{th}$ updated transaction world state;

the previous account state acquiring subunit 1343 is configured to acquire the previous account state of the $j^{th}$ account address from the $(k-1)^{th}$ committed world state;

the world state committing subunit 1344 is configured to commit the present account state corresponding to the $j^{th}$ account address to the previous account state of the $j^{th}$ account address, and insert the $j^t$ account address into the dirty account address set contained in the $(k-1)^{th}$ committed world state to obtain a $j^{th}$ transition committed world state;

the world state determining subunit 1345 is configured to empty, when j is equal to I, the dirty account address set and the account state mapping contained in the $k^{th}$ updated transaction world state, and use an $I^t$ transition committed world state as the $k^{th}$ committed world state.

The present account state corresponding to the $j^{th}$ account address contains first state data mapping, the previous account state of the $j^{th}$ account address contains second state data mapping, and the world state committing subunit 1345 is specifically configured to update the mapping relationship of the state data key and the state data value in the first state data mapping into the second state data mapping; inserting state data keys in the first state data mapping into the dirty state data key set contained in the previous account state of the $j^t$ account address to obtain the $j^{th}$ transition committed world state.

The specific modes of implementation of the address acquiring subunit 1341, the present account state acquiring subunit 1342, the previous account state acquiring subunit 1343, the world state committing subunit 1344 and the world state determining subunit 1345 may refer to the description of S204 in the embodiment corresponding to FIG. 5 above, and will not be repeated herein.

The second state updating module 14 includes: a tree query unit 141, a first query processing unit 142, a second query processing unit 143, a first tree constructing unit 144 and a second tree constructing unit 145.

The tree query unit 141 is configured to perform world state tree query on an initial update state;

the first query processing unit 142 is configured to perform, when the initial update state contains a first world state tree, chain-wide dirty account state committing processing on the initial update state to obtain the updated first world state;

the second query processing unit 143 is configured to search for, when the initial update state does not contains a first world state tree, a second world state based on a first previous world state pointer;

the first tree constructing unit 144 is configured to perform processing of constructing a clean state tree on the second world state based on the world state chain to obtain a clean previous world state tree;

the second tree constructing unit 145 is configured to use the previous state tree root of the clean previous world state tree as a present state tree root;

the second tree constructing unit 145 is further configured to construct a second world state tree corresponding to the initial update state based on a first tree node cache and the present state tree root, and add the second world state tree to the initial update state to obtain a transition initial update state;

a dirty state committing unit 146 is configured to perform chain-wide dirty account state committing processing on the transition initial update state to obtain the updated first world state.

The specific modes of implementation of the tree query unit 141, the first query processing unit 142, the second query processing unit 143, the first tree constructing unit 144 and the second tree constructing unit 145 may refer to the description of S301-S306 in the embodiment corresponding to FIG. 6 above, and will not be repeated herein.

The dirty state committing unit 146 includes: a dirty data committing subunit 1461, a root acquiring subunit 1462, a tree updating subunit 1463, and a tree committing subunit 1464.

The dirty data committing subunit 1461 is configured to perform chain-wide dirty state data committing processing on the transition initial update state to obtain a committed transition initial update state and a chain-wide dirty account address set;

the root acquiring subunit 1462 is configured to acquire, according to the committed transition initial update state, the account state root corresponding to each chain-wide dirty account address in the chain-wide dirty account address set;

the tree updating subunit 1463 is configured to update each chain-wide dirty account address and the account state root corresponding to each chain-wide dirty account address to a second world state tree to obtain a clean present world state tree;

the tree committing subunit 1464 is configured to store the association relationship of the updated tree node hash and the updated tree node of the clean present world state tree into the tree node mapping of the tree node cache in the committed transition initial update state to obtain the updated first world state.

The dirty data committing subunit 1461 is specifically configured to sequentially traverses the world state chain to acquire the dirty account address set contained in an $x^{th}$ world state as an $x^{th}$ dirty account address set; x being a positive integer less than or equal to Z; Z being the sequential ordinal number of the transition initial update state in the world state chain; traverse the account addresses in the $x^{th}$ dirty account address set to acquire an $m^{th}$ account address in sequence; m being a positive integer less than or equal to the total number of account addresses in the $x^{th}$ dirty account address set; acquire a present account state and a previous account state corresponding to the $m^{th}$ account address; perform account dirty state data committing processing on the present account state of the $m^{th}$ account address based on the previous account state of the $m^{th}$ account address; obtain an $x^{th}$ committed world state after account dirty state data committing processing is performed on the present account state of each dirty account address in the $x^{th}$ dirty account address set; add each dirty account address in the $x^{th}$ dirty account address set to an $(x-1)^{th}$ on-chain dirty account address set to obtain an $x^{th}$ on-chain dirty account address set; when x is 1, the $(x-1)^{th}$ on-chain dirty account address set being an empty set; and when x is equal to Z, take the $x^{th}$ on-chain dirty account address set as a chain-wide dirty account address set, and take the $x^{th}$ committed world state as the committed transition initial update state.

The dirty data committing subunit 1461 is specifically further configured to perform account state tree query on the present account state of the $m^{th}$ account address; if the present account state of the $m^{th}$ account address does not contain an account state tree, or the account state root of the present account state of the $m^{th}$ account address is not equal to the account state root of the previous account state of the $m^{th}$ account address, build a specified account state tree based on the tree node cache of the present account state of the $m^{th}$ account address and the account state root of the previous account state of the $m^{th}$ account address, add the specified account state tree to the present account state of the $m^{th}$ account address, and update the account state root of the present account state of the $m^{th}$ account address to the account state root of the previous account state of the $m^{th}$ account address to obtain a specified account state; if the present account state of the $m^{th}$ account address contains an account state tree and the account state root of the present account state of the $m^{th}$ account address is equal to the account state root of the previous account state of the $m^{th}$ account address, use the present account state of the $m^{th}$ account address as a specified account state; if the first dirty state data key set of the specified account state is not empty, acquire state data values corresponding to dirty state data keys in the first dirty state data key set from the state data mapping of the specified account state, and update the dirty state data keys in the first dirty state data key set and the state data values corresponding to the dirty state data keys in the first dirty state data key set to the account state tree of the specified account state to obtain the specified account state containing the updated account state tree; update the account state root of the specified account state containing the updated account state tree to the state tree root of a to-be-updated account state tree; empty the dirty state data key set of the specified account state containing the updated account state tree; and store the association relationship of the updated tree node hash and the updated tree node of the updated account state tree to the $x^{th}$ world state.

The specific modes of implementation of the dirty data committing subunit 1461, the root acquiring subunit 1462, the tree updating subunit 1463 and the tree committing subunit 1464 may refer to the description of S306 in the embodiment corresponding to FIG. 3 above, and will not be repeated herein.

The apparatus 1 for processing data includes: a committing module 17, an updating module 18 and an emptying module 19, the committing module 17 is configured to perform chain-wide dirty account state committing processing on the committed latest on-chain world state to obtain a clean latest on-chain world state, the tree node cache in the clean latest on-chain world state including first tree node mapping;

the updating module 18 is configured to update tree node hashes and tree nodes contained in the first tree node mapping to a tree node database;

the emptying module 19 is configured to empty the dirty account address set, the account state mapping and the first tree node mapping in the clean latest on-chain world state.

The specific modes of implementation of the committing module 17, the updating module 18 and the emptying module 19 may refer to the description in the embodiment corresponding to FIG. 3 above, and will not be repeated herein.

Figure 8:
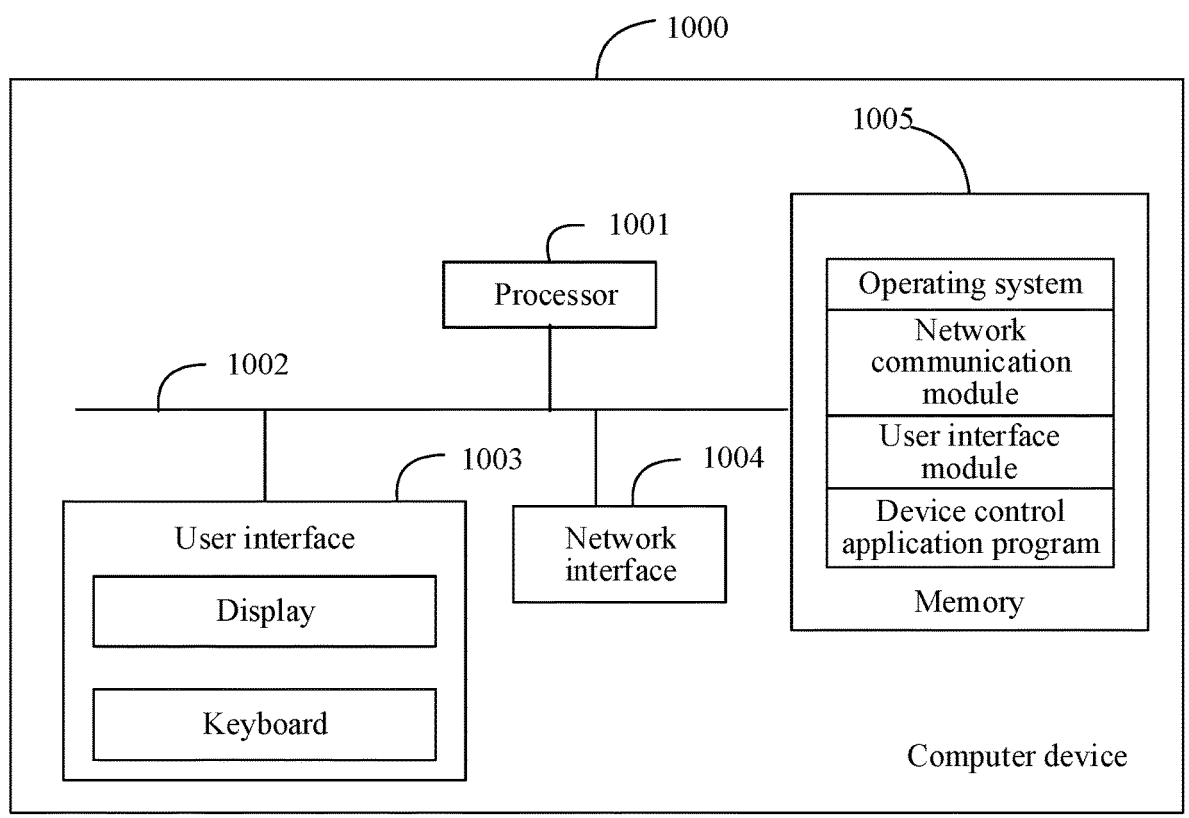
FIG. 8 is a schematic structural diagram of a computer device according to an embodiment of the present disclosure.

Please refer to FIG. 8 and FIG. 8 is a schematic structural diagram of a computer device according to an embodiment of the present disclosure. As shown in FIG. 8, the apparatus 1 for processing data in the embodiment corresponding to FIG. 7 above may be applied to a computer device 1000, and the computer device 1000 may include: a processor 1001, a network interface 1004 and a memory 1005, in addition, the above computer device 1000 may further include: a user interface 1003 and at least one communication bus 1002. The communications bus 1002 is configured to implement connection and communication between these components. The user interface 1003 may include a display and a keyboard. In some implementations, the user interface 1003 may further include a standard wired interface and wireless interface. In some implementations, the network interface 1004 may include a standard wired interface and wireless interface (for example, a WiFi interface). The memory 1005 may be a high-speed RAM, or may be a non-volatile memory, for example, at least one magnetic disk memory. In some implementations, the memory 1005 may be at least one storage apparatus that is located far away from the foregoing processor 1001. As shown in FIG. 8, the memory 1005 used as a computer-readable storage medium may include an operating system, a network communications module, a user interface module, and a device-control application program.

In the computer device 1000 as shown in FIG. 8, the network interface 1004 may provide network communication network elements; the user interface 1003 is primarily configured to provide an interface for user input; the processor 1001 may be configured to invoke a device control application program stored in the memory 1005 to implement:

generating an initial block, and creating a first world state corresponding to the initial block; the first world state having a chained relationship pointing to a second world state, the second world state being a world state corresponding to a parent block of the initial block; the first world state and the second world state existing in a world state chain; the second world state being a consensus root world state when the parent block is a block with the largest block height in on-chained blocks; the first world state in the world state chain being a latest on-chain world state; the consensus root world state having a chained relationship pointing to the latest on-chain world state; the latest on-chain world state being used for recording a latest world state corresponding to the on-chained block;

updating the first world state according to transactions in the initial block to obtain an initial update state, and performing processing of constructing a clean state tree on the initial update state based on the world state chain to obtain an updated first world state, the updated first world state including a clean present world state tree;

writing a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and writing the to-be-on-chained block into a blockchain when the consensus result is a consensus pass result, committing the updated first world state to the latest on-chain world state step by step via the world state chain, and determining the updated first world state as a new consensus root world state, the new consensus root world state having a chained relationship pointing to the committed latest on-chain world state.

It will be appreciated that the computer device 1000 described in the embodiment of the present disclosure can execute the description on the method for processing data in any one corresponding embodiment in FIG. 3 before, which will not be repeated herein. In addition, the description of beneficial effects of the same method are not described herein again.

In various embodiments in the present disclosure, a unit (or similarly subunit) may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module (or similarly sub-module) may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In addition, an embodiment of the present disclosure further provides a computer-readable storage medium, and a computer program executed by the apparatus 1 for processing data mentioned above is stored in the computer-readable storage medium, and the computer program includes program instructions, the processor, when executing the program instruction, is able to execute the description on the method for processing data in any one corresponding embodiment in FIG. 3 before, which will not be repeated herein. In addition, the description of beneficial effects of the same method are not described herein again. For technical details that are not disclosed in the computer-readable storage medium embodiments of the present disclosure, please refer to the descriptions of the method embodiments of the present disclosure.

The computer-readable storage medium can be the apparatus for processing data according to any one embodiment above or the internal storage unit of the computer device, such as the hard disk or internal memory of the computer device. The computer-readable storage medium may also be an external storage device of the computer device, for example, a plug-in type hard disk being equipped on the computer device, a smart media card (SMC), a secure digital (SD) card, a flash card, etc. Further, the computer-readable storage medium can also include both the internal storage unit of the computer device and an external storage device. The computer-readable storage medium is configured to store other programs and data needed for the computer program and the computer device. The computer-readable storage medium can be also configured to temporarily store the data that has been outputted or will be outputted.

In addition, an embodiment of the present disclosure further provides a computer program product or computer program, the computer program product or the computer program including computer instructions, the computer instruction being stored in a computer-readable storage medium. The processor of the computer device reads the computer instruction from the computer-readable storage medium, and the processor executes the computer instruction such that the computer device executes the method according to any one corresponding embodiment above.

Terms such as "first", "second", etc. in this description, claims, and the accompanying drawings of the present disclosure are used to distinguish different objects and are not used to describe a specific sequence. In addition, the terms "include", and any variant thereof are intended to cover a non-exclusive inclusion. For example, a process, method, apparatus, product or device that includes a series of steps or units is not limited to the listed steps or modules; and instead, further optionally includes a step or module that is not listed, or further optionally includes another step or unit that is intrinsic to the process, method, apparatus, product, or device.

A person of ordinary skill in the art may understand that, units and algorithm steps of the examples described in the embodiments disclosed herein may be implemented by electronic hardware, computer software, or a combination thereof. To clearly describe the interchangeability between the hardware and the software, the foregoing has generally described compositions and steps of each example based on network elements. Whether the network elements are executed in a mode of hardware or software depends on particular applications and design constraint conditions of the technical solutions. A person skilled in the art may use different methods to implement the described network elements for each particular application, but it is not considered that the implementation goes beyond the scope of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A method for processing blockchain-based data, the method being executed by a computer device, the method comprising:

generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block;

updating the first world state according to transactions in the initial block to obtain an initial updated state, and performing processing of constructing a clean state tree on the initial updated state based on the world state chain to obtain an updated first world state, the updated first world state comprising a clean present world state tree;

adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

2. The method according to claim 1, wherein the creating the first world state corresponding to the initial block comprises:

creating an initial world state corresponding to the initial block, the initial world state comprising a first previous world state pointer and a first tree node cache, the first tree node cache comprising a first previous tree node cache pointer; and pointing the first previous world state pointer to a second world state corresponding to the parent block of the initial block, and pointing the first previous tree node cache pointer to a second tree node cache comprised in the second world state to obtain a first world state corresponding to the initial block.

3. The method according to claim 1, wherein the updating the first world state according to transactions in the initial block to obtain an initial updated state comprises:

sequentially traversing transactions in the initial block to acquire a $k^{th}$ transaction in the initial block; k being a positive integer less than or equal to H; H being a total number of the transactions in the initial block;

creating a $k^{th}$ transaction world state corresponding to the $k^{th}$ transaction; the $k^{th}$ transaction world state having a chained relationship pointing to a $(k-1)^{th}$ committed world state; the $(k-1)^{th}$ committed world state being the first world state when k is 1;

executing the $k^{th}$ transaction, and performing, during the execution of the $k^{th}$ transaction, state updating processing on the $k^{th}$ transaction world state to obtain a $k^{th}$ updated transaction world state;

committing, when the $k^{th}$ transaction is executed successfully, the $k^{th}$ updated transaction world state to the $(k-1)^{th}$ committed world state to obtain a $k^{th}$ committed world state; and using an $H^{th}$ committed world state as the initial updated state when k is equal to H.

4. The method according to claim 3, wherein:

the $k^{th}$ transaction world state comprises account state mapping and a dirty account address set; and the executing the $k^{th}$ transaction, and performing, during the execution of the $k^{th}$ transaction, state updating processing on the $k^{th}$ transaction world state to obtain a $k^{th}$ updated transaction world state comprise:

executing the $k^{th}$ transaction, and determine, during the execution of the $k^{th}$ transaction, to-be-updated data corresponding to the $k^{th}$ transaction, the to-be-updated data comprising a to-be-updated account address, a to-be-updated state data key and a to-be-updated state data value;

acquiring an account state corresponding to the to-be-updated account address based on the $k^{th}$ transaction world state as a to-be-updated account state, the to-be-updated account state comprising to-be-updated state data mapping and a to-be-updated dirty state data key set;

updating mapping relationship of the to-be-updated state data key and the to-be-updated state data value into the to-be-updated state data mapping and inserting the to-be-updated state data key into the to-be-updated dirty state data key set to obtain a present account state; and updating the mapping relationship of the to-be-updated account address and the present account state into the account state mapping comprised in the $k^{th}$ transaction world state, and inserting the to-be-updated account address into the dirty account address set comprised in the $k^{th}$ transaction world state to obtain the $k^{th}$ updated transaction world state.

5. The method according to claim 4, wherein the acquiring the account state corresponding to the to-be-updated account address based on the $k^{th}$ transaction world state as the to-be-updated account state comprises:

performing account state mapping sequence search from the $k^{th}$ transaction world state to the latest on-chain world state based on the to-be-updated account address;

in response to an account state having a mapping relationship with the to-be-updated account address being found during the account state mapping sequence search, taking the first found account state having a mapping relationship with the to-be-updated account address as a to-be-updated account state; and in response to an account state having a mapping relationship with the to-be-updated account address being not found during the account state mapping sequence search, acquiring a to-be-updated state tree root corresponding to the to-be-updated account address based on a world state tree in the latest on-chain world state, and establishing a to-be-updated account state according to the to-be-updated account address and the to-be-updated state tree root.

6. The method according to claim 4, wherein the committing, when the $k^{th}$ transaction is executed successfully, the $k^{th}$ updated transaction world state to the $(k-1)^{th}$ committed world state to obtain the $k^{th}$ committed world state comprises:

traversing account addresses in the dirty account address set comprised in the $k^{th}$ updated transaction world state to sequentially acquire a $j^{th}$ account address; j being a positive integer less than or equal to I; I being the total number of the account addresses in the dirty account address set comprised in the $k^{th}$ updated transaction world state;

acquiring a present account state corresponding to the $j^{th}$ account address from the account state mapping comprised in the $k^{th}$ updated transaction world state;

acquiring a previous account state of the $j^{th}$ account address from the $(k-1)^{th}$ committed world state;

committing the present account state corresponding to the $j^{th}$ account address to the previous account state of the $j^{th}$ account address, and inserting the $j^{th}$ account address into the dirty account address set comprised in the $(k-1)^{th}$ committed world state to obtain a $j^{th}$ transition committed world state; and in response to j being equal to I, emptying the dirty account address set and the account state mapping comprised in the $k^{th}$ updated transaction world state, and using an $I^{th}$ transition committed world state as a $k^{th}$ committed world state.

7. The method according to claim 6, wherein:

the present account state corresponding to the $j^{th}$ account address comprises first state data mapping, the previous account state of the $j^{th}$ account address comprises second state data mapping, and the committing the present account state corresponding to the $j^{th}$ account address to the previous account state of the $j^{th}$ account address, and inserting the $j^{th}$ account address into the dirty account address set comprised in the $(k-1)^{th}$ committed world state to obtain the $j^{th}$ transition committed world state comprise:

updating the mapping relationship of state data keys and state data values in the first state data mapping into the second state data mapping; and inserting state data keys in the first state data mapping into the dirty state data key set comprised in the previous account state of the $j^{th}$ account address to obtain a $j^{th}$ transition committed world state.

8. The method according to claim 2, wherein the performing processing of constructing the clean state tree on the initial updated state based on the world state chain to obtain the updated first world state comprises:

performing world state tree query on the initial updated state;

in response to the initial updated state comprising a first world state tree, performing chain-wide dirty account state committing processing on the initial updated state to obtain the updated first world state;

in response to the initial updated state not comprising the first world state tree, searching for the second world state based on the first previous world state pointer;

performing processing of constructing a clean state tree on the second world state based on the world state chain to obtain a clean previous world state tree;

using a previous state tree root of the clean previous world state tree as a present state tree root;

constructing a second world state tree corresponding to the initial updated state based on the first tree node cache and the present state tree root, and adding the second world state tree to the initial updated state to obtain a transition initial updated state; and performing chain-wide dirty account state committing processing on the transition initial updated state to obtain the updated first world state.

9. The method according to claim 8, wherein the performing chain-wide dirty account state committing processing on the transition initial updated state to obtain the updated first world state comprises:

performing chain-wide dirty state data committing processing on the transition initial updated state to obtain a committed transition initial updated state and a chain-wide dirty account address set;

acquiring, based on the committed transition initial updated state, an account state root corresponding to each chain-wide dirty account address in the chain-wide dirty account address set;

updating each chain-wide dirty account address and the account state root corresponding to each chain-wide dirty account address to the second world state tree to obtain a clean present world state tree; and storing the association relationship of an updated tree node hash and an updated tree node of the clean present world state tree into tree node mapping of a tree node cache in the committed transition initial updated state to obtain the updated first world state.

10. The method according to claim 9, wherein the performing chain-wide dirty state data committing processing on the transition initial updated state to obtain a committed transition initial updated state and a chain-wide dirty account address set comprises:
  sequentially traversing the world state chain to acquire the dirty account address set comprised in an $x^{th}$ world state as an $x^{th}$ dirty account address set; x being a positive integer less than or equal to Z; Z being a sequential ordinal number of the transition initial updated state in the world state chain;
  traversing account addresses in the $x^{th}$ dirty account address set to acquire an $m^{th}$ account address in sequence; m being a positive integer less than or equal to the total number of the account addresses in the $x^{th}$ dirty account address set;
  acquiring a present account state and a previous account state corresponding to the $m^{th}$ account address;
  performing account dirty state data committing processing on the present account state of the $m^{th}$ account address based on the previous account state of the $m^{th}$ account address;
  obtaining an $x^{th}$ committed world state after account dirty state data committing processing is performed on the present account state of each dirty account address in the $x^{th}$ dirty account address set;
  adding each dirty account address in the $x^{th}$ dirty account address set to an $(x-1)^{th}$ on-chain dirty account address set to obtain an $x^{th}$ on-chain dirty account address set; in response to x being 1, the $(x-1)^{th}$ on-chain dirty account address set being an empty set; and
  in response to x being equal to Z, taking the $x^{th}$ on-chain dirty account address set as a chain-wide dirty account address set, and taking the $x^{th}$ committed world state as the committed transition initial updated state.

11. The method according to claim 10, wherein the performing account dirty state data committing processing on the present account state of the $m^{th}$ account address based on the previous account state of the $m^{th}$ account address comprises:
  performing account state tree query on the present account state of the $m^{th}$ account address;
  when the present account state of the $m^{th}$ account address does not comprise an account state tree, or the account state root of the present account state of the $m^{th}$ account address is not equal to the account state root of the previous account state of the $m^{th}$ account address, building a specified account state tree based on the tree node cache of the present account state of the $m^{th}$ account address and the account state root of the previous account state of the $m^{th}$ account address, adding the specified account state tree to the present account state of the $m^{th}$ account address, and updating the account state root of the present account state of the $m^{th}$ account address to the account state root of the previous account state of the $m^{th}$ account address to obtain a specified account state;
  when the present account state of the $m^{th}$ account address comprises an account state tree and the account state root of the present account state of the $m^{th}$ account address is equal to the account state root of the previous account state of the $m^{th}$ account address, using the present account state of the $m^{th}$ account address as a specified account state;
  when a first dirty state data key set of the specified account state is not empty, acquiring state data values corresponding to dirty state data keys in the first dirty state data key set from the state data mapping of the specified account state, and updating the dirty state data keys in the first dirty state data key set and the state data values corresponding to the dirty state data keys in the first dirty state data key set to the account state tree of the specified account state to obtain a specified account state comprising the updated account state tree;
  updating the account state root of the specified account state comprising the updated account state tree to the state tree root of the updated account state tree;
  emptying the dirty state data key set of the specified account state comprising the updated account state tree; and
  storing the association relationship of the updated tree node hash and the updated tree node of the updated account state tree to the $x^{th}$ world state.

12. The method according to claim 11, wherein the method further comprises:
  performing chain-wide dirty account state committing processing on the committed latest on-chain world state to obtain a clean latest on-chain world state, a tree node cache in the clean latest on-chain world state comprising first tree node mapping;
  updating tree node hashes and tree nodes comprised in the first tree node mapping to a tree node database; and
  emptying a dirty account address set, account state mapping and the first tree node mapping in the clean latest on-chain world state.

13. An apparatus for processing blockchain-based data, the apparatus comprising:
  a memory storing instructions; and
  a processor in communication with the memory, wherein, when the processor executes the instructions, the processor is configured to cause the apparatus to perform:
    generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block;
    updating the first world state according to transactions in the initial block to obtain an initial updated state, and performing processing of constructing a clean state tree on the initial updated state based on the world state chain to obtain an updated first world state, the updated first world state comprising a clean present world state tree;
    adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

14. The apparatus according to claim 13, wherein, when the processor is configured to cause the apparatus to perform creating the first world state corresponding to the initial block, the processor is configured to cause the apparatus to perform:

creating an initial world state corresponding to the initial block, the initial world state comprising a first previous world state pointer and a first tree node cache, the first tree node cache comprising a first previous tree node cache pointer; and pointing the first previous world state pointer to a second world state corresponding to the parent block of the initial block, and pointing the first previous tree node cache pointer to a second tree node cache comprised in the second world state to obtain a first world state corresponding to the initial block.

15. The apparatus according to claim 13, wherein, when the processor is configured to cause the apparatus to perform updating the first world state according to transactions in the initial block to obtain an initial updated state, the processor is configured to cause the apparatus to perform:

sequentially traversing transactions in the initial block to acquire a $k^{th}$ transaction in the initial block; k being a positive integer less than or equal to H; H being a total number of the transactions in the initial block;

creating a $k^{th}$ transaction world state corresponding to the $k^{th}$ transaction; the $k^{th}$ transaction world state having a chained relationship pointing to a $(k-1)^{th}$ committed world state; the $(k-1)^{th}$ committed world state being the first world state when k is 1;

executing the $k^{th}$ transaction, and performing, during the execution of the $k^{th}$ transaction, state updating processing on the $k^{th}$ transaction world state to obtain a $k^{th}$ updated transaction world state;

committing, when the $k^{th}$ transaction is executed successfully, the $k^{th}$ updated transaction world state to the $(k-1)^{th}$ committed world state to obtain a $k^{th}$ committed world state; and using an $H^{th}$ committed world state as the initial updated state when k is equal to H.

16. The apparatus according to claim 15, wherein:

the $k^{th}$ transaction world state comprises account state mapping and a dirty account address set; and when the processor is configured to cause the apparatus to perform executing the $k^{th}$ transaction, and performing, during the execution of the $k^{th}$ transaction, state updating processing on the $k^{th}$ transaction world state to obtain a $k^{th}$ updated transaction world state, the processor is configured to cause the apparatus to perform:

executing the $k^{th}$ transaction, and determine, during the execution of the $k^{th}$ transaction, to-be-updated data corresponding to the $k^{th}$ transaction, the to-be-updated data comprising a to-be-updated account address, a to-be-updated state data key and a to-be-updated state data value;

acquiring an account state corresponding to the to-be-updated account address based on the $k^{th}$ transaction world state as a to-be-updated account state, the to-be-updated account state comprising to-be-updated state data mapping and a to-be-updated dirty state data key set;

updating mapping relationship of the to-be-updated state data key and the to-be-updated state data value into the to-be-updated state data mapping and inserting the to-be-updated state data key into the to-be-updated dirty state data key set to obtain a present account state; and updating the mapping relationship of the to-be-updated account address and the present account state into the account state mapping comprised in the $k^{th}$ transaction world state, and inserting the to-be-updated account address into the dirty account address set comprised in the $k^{th}$ transaction world state to obtain the $k^{th}$ updated transaction world state.

17. A non-transitory computer-readable storage medium, storing computer-readable instructions, wherein, the computer-readable instructions, when executed by a processor, are configured to cause the processor to perform:

generating an initial block, and creating a first world state corresponding to the initial block; the first world state having a chained relationship pointing to a second world state, the second world state being a world state corresponding to a parent block of the initial block; the first world state and the second world state existing in a world state chain; in response to the parent block being a block with a largest block height in on-chained blocks, the second world state being a consensus root world state; the first world state in the world state chain being a latest on-chain world state; the consensus root world state having a chained relationship pointing to the latest on-chain world state; the latest on-chain world state being used for recording a latest world state corresponding to the on-chained block;

updating the first world state according to transactions in the initial block to obtain an initial updated state, and performing processing of constructing a clean state tree on the initial updated state based on the world state chain to obtain an updated first world state, the updated first world state comprising a clean present world state tree;

adding a first world state root corresponding to the clean present world state tree into the initial block to obtain a to-be-on-chained block, and transmitting the to-be-on-chained block to consensus nodes to cause the consensus node to perform consensus processing on the to-be-on-chained block based on the first world state root to obtain a consensus result; and in response to the consensus result being a consensus pass result, incorporating the to-be-on-chained block into a blockchain, committing the updated first world state to the latest on-chain world state, and determining the updated first world state as a new consensus root world state, the new consensus root world state having a chained relationship pointing to the committed latest on-chain world state.

18. The non-transitory computer-readable storage medium according to claim 17, wherein, when the computer-readable instructions are configured to cause the processor to perform creating the first world state corresponding to the initial block, the computer-readable instructions are configured to cause the processor to perform:

creating an initial world state corresponding to the initial block, the initial world state comprising a first previous world state pointer and a first tree node cache, the first tree node cache comprising a first previous tree node cache pointer; and pointing the first previous world state pointer to a second world state corresponding to the parent block of the initial block, and pointing the first previous tree node cache pointer to a second tree node cache comprised in the second world state to obtain a first world state corresponding to the initial block.

19. The non-transitory computer-readable storage medium according to claim 17, wherein, when the computer-readable instructions are configured to cause the processor to perform updating the first world state according to transactions in the initial block to obtain an initial updated state, the computer-readable instructions are configured to cause the processor to perform:

sequentially traversing transactions in the initial block to acquire a $k^{th}$ transaction in the initial block; k being a positive integer less than or equal to H; H being a total number of the transactions in the initial block;

creating a $k^{th}$ transaction world state corresponding to the $k^{th}$ transaction; the $k^{th}$ transaction world state having a chained relationship pointing to a $(k-1)^{th}$ committed world state; the $(k-1)^{th}$ committed world state being the first world state when k is 1;

executing the $k^{th}$ transaction, and performing, during the execution of the $k^{th}$ transaction, state updating processing on the $k^{th}$ transaction world state to obtain a $k^{th}$ updated transaction world state;

committing, when the $k^{th}$ transaction is executed successfully, the $k^{th}$ updated transaction world state to the $(k-1)^{th}$ committed world state to obtain a $k^{th}$ committed world state; and using an $H^{th}$ committed world state as the initial updated state when k is equal to H.

20. The non-transitory computer-readable storage medium according to claim 19, wherein:

the $k^{th}$ transaction world state comprises account state mapping and a dirty account address set; and when the computer-readable instructions are configured to cause the processor to perform executing the $k^{th}$ transaction, and performing, during the execution of the $k^{th}$ transaction, state updating processing on the $k^{th}$ transaction world state to obtain a $k^{th}$ updated transaction world state, the computer-readable instructions are configured to cause the processor to perform:

executing the $k^{th}$ transaction, and determine, during the execution of the $k^{th}$ transaction, to-be-updated data corresponding to the $k^{th}$ transaction, the to-be-updated data comprising a to-be-updated account address, a to-be-updated state data key and a to-be-updated state data value;

acquiring an account state corresponding to the to-be-updated account address based on the $k^{th}$ transaction world state as a to-be-updated account state, the to-be-updated account state comprising to-be-updated state data mapping and a to-be-updated dirty state data key set;

updating mapping relationship of the to-be-updated state data key and the to-be-updated state data value into the to-be-updated state data mapping and inserting the to-be-updated state data key into the to-be-updated dirty state data key set to obtain a present account state; and updating the mapping relationship of the to-be-updated account address and the present account state into the account state mapping comprised in the $k^{th}$ transaction world state, and inserting the to-be-updated account address into the dirty account address set comprised in the $k^{th}$ transaction world state to obtain the $k^{th}$ updated transaction world state.

\* \* \* \* \*